US011287657B2

(12) United States Patent
Klug

(10) Patent No.: US 11,287,657 B2
(45) Date of Patent: Mar. 29, 2022

(54) DISPLAY SYSTEM AND METHOD FOR PROVIDING VARIABLE ACCOMMODATION CUES USING MULTIPLE INTRA-PUPIL PARALLAX VIEWS FORMED BY LIGHT EMITTER ARRAYS

(71) Applicant: Magic Leap, Inc., Plantation, FL (US)

(72) Inventor: Michael Anthony Klug, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/803,563

(22) Filed: Feb. 27, 2020

(65) Prior Publication Data

US 2020/0301147 A1 Sep. 24, 2020

Related U.S. Application Data

(60) Provisional application No. 62/812,142, filed on Feb. 28, 2019, provisional application No. 62/815,225, filed on Mar. 7, 2019.

(51) Int. Cl.
*G02B 27/01* (2006.01)
*H04N 13/344* (2018.01)
(Continued)

(52) U.S. Cl.
CPC ....... *G02B 27/0172* (2013.01); *G02B 6/0076* (2013.01); *G02B 25/001* (2013.01);
(Continued)

(58) Field of Classification Search
None
See application file for complete search history.

(56) References Cited

U.S. PATENT DOCUMENTS 6,445,406 B1  9/2002 Taniguchi et al.
6,590,573 B1  7/2003 Geshwind et al.
(Continued)

FOREIGN PATENT DOCUMENTS

CN  104570366  4/2015
CN  104749779  7/2015
(Continued)

OTHER PUBLICATIONS

Huang F.-C. et al., "The Light Field Stereoscope—Immersive Computer Graphics via Factored Near-Eye Light Field displays with Focus Cues", SIGGRAPH Emerging Technologies (Jul. 2015) in 12 pages.
(Continued)

*Primary Examiner* — Talha M Nawaz
(74) *Attorney, Agent, or Firm* — Knobbe, Martens, Olson & Bear, LLP

(57) ABSTRACT

A display system is configured to direct a plurality of parallactically-disparate intra-pupil images into a viewer's eye. The parallactically-disparate intra-pupil images provide different parallax views of a virtual object, and impinge on the pupil from different angles. In the aggregate, the wavefronts of light forming the images approximate a continuous divergent wavefront and provide selectable accommodation cues for the user, depending on the amount of parallax disparity between the intra-pupil images. The amount of parallax disparity may be selected using an array of shutters that selectively regulate the entry of image light into an eye. Each opened shutter in the array provides a different intra-pupil image, and the locations of the open shutters provide the desired amount of parallax disparity between the images. In some other embodiments, the images may be formed by an emissive micro-display. Each pixel formed by the micro-display may be formed by one of a group of light emitters,
(Continued)

which are at different locations such that the emitted light takes different paths to the eye, the different paths providing different amounts of parallax disparity.

10 Claims, 15 Drawing Sheets

(51) Int. Cl.
| | |
|---|---|
| H04N 13/398 | (2018.01) |
| G02B 30/24 | (2020.01) |
| F21V 8/00 | (2006.01) |
| G02B 25/00 | (2006.01) |
| G02B 27/10 | (2006.01) |
| G02B 27/14 | (2006.01) |
| G02B 27/30 | (2006.01) |
| G09G 3/00 | (2006.01) |

(52) U.S. Cl.
CPC ......... *G02B 27/102* (2013.01); *G02B 27/149* (2013.01); *G02B 27/30* (2013.01); *G02B 30/24* (2020.01); *G09G 3/003* (2013.01); *H04N 13/344* (2018.05); *H04N 13/398* (2018.05); *G02B 2027/0134* (2013.01); *G02B 2027/0178* (2013.01)

(56) References Cited

U.S. PATENT DOCUMENTS

| | | | |
|---|---|---|---|
| 6,850,221 | B1 | 2/2005 | Tickle |
| 8,573,784 | B2 | 11/2013 | Yeh et al. |
| 8,950,867 | B2 | 2/2015 | Macnamara |
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,841,563 | B2 | 12/2017 | Lapstun |
| 9,851,563 | B2 | 12/2017 | Gao et al. |
| 9,857,591 | B2 | 1/2018 | Welch et al. |
| 9,874,749 | B2 | 1/2018 | Bradski |
| 10,106,153 | B1* | 10/2018 | Xiao ............... G06K 9/00812 |
| 2003/0197933 | A1 | 10/2003 | Sudo et al. |
| 2006/0028436 | A1 | 2/2006 | Armstrong |
| 2007/0081123 | A1 | 4/2007 | Lewis |
| 2009/0005961 | A1 | 1/2009 | Grabowski et al. |
| 2012/0127062 | A1 | 5/2012 | Bar-Zeev et al. |
| 2012/0162549 | A1 | 6/2012 | Gao et al. |
| 2012/0306860 | A1 | 12/2012 | Hatta et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0126618 | A1 | 5/2013 | Gao |
| 2013/0208234 | A1 | 8/2013 | Lewis |
| 2013/0242262 | A1 | 9/2013 | Lewis |
| 2013/0286053 | A1 | 10/2013 | Fleck et al. |
| 2014/0063077 | A1 | 3/2014 | Wetzstein et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0205259 | A1 | 7/2015 | Kim et al. |
| 2015/0222883 | A1 | 8/2015 | Welch |
| 2015/0222884 | A1 | 8/2015 | Cheng |
| 2015/0234190 | A1 | 8/2015 | Schowengerdt |
| 2015/0235418 | A1 | 8/2015 | Schowengerdt |
| 2015/0235446 | A1 | 8/2015 | Schowengerdt |
| 2015/0235448 | A1 | 8/2015 | Schowengerdt |
| 2015/0260994 | A1 | 9/2015 | Akutsu et al. |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | Tekolste et al. |
| 2015/0346495 | A1 | 12/2015 | Welch et al. |
| 2015/0370075 | A1 | 12/2015 | Ato et al. |
| 2016/0011419 | A1 | 1/2016 | Gao |
| 2016/0026253 | A1 | 1/2016 | Bradski et al. |
| 2016/0116739 | A1 | 4/2016 | TeKolste et al. |
| 2016/0139402 | A1* | 5/2016 | Lapstun ................ G09G 3/003 349/193 |
| 2016/0270656 | A1 | 9/2016 | Samec et al. |
| 2017/0078652 | A1 | 3/2017 | Hua et al. |
| 2017/0091917 | A1* | 3/2017 | Bronstein ............... G06T 5/20 |
| 2017/0102545 | A1* | 4/2017 | Hua ....................... H04N 13/31 |
| 2018/0025640 | A1* | 1/2018 | Micks ............... G06K 9/00812 340/932.2 |
| 2018/0031838 | A1* | 2/2018 | Browne ............... H04N 13/332 |
| 2018/0113311 | A1 | 4/2018 | Klug et al. |
| 2019/0075252 | A1* | 3/2019 | Zhao ..................... G01C 21/00 |
| 2019/0253667 | A1* | 8/2019 | Valli ................... G02B 27/017 |
| 2020/0033803 | A1 | 1/2020 | Christmas |
| 2020/0279483 | A1* | 9/2020 | Eather ................... G08G 1/146 |
| 2021/0096565 | A1* | 4/2021 | Xie ....................... G08G 1/143 |

FOREIGN PATENT DOCUMENTS

| | | |
|---|---|---|
| CN | 104914577 | 9/2015 |
| JP | 2001-078234 A | 3/2001 |
| JP | 2002-131694 A | 5/2002 |
| JP | 2002-228987 | 8/2002 |
| JP | 2011-244349 A | 12/2011 |
| WO | WO 2006/022620 | 3/2006 |
| WO | WO 2015/081313 | 6/2015 |
| WO | WO 2015/134740 | 9/2015 |
| WO | WO 2015/155406 | 10/2015 |
| WO | WO 2016/134037 | 8/2016 |
| WO | WO 2016/143076 | 9/2016 |
| WO | WO 2017/079480 | 5/2017 |
| WO | WO 2018/075968 | 5/2019 |
| WO | WO 2020/176783 | 9/2020 |

OTHER PUBLICATIONS

Wetzstein G. et al., "Tensor Displays: Compressive Light Field Synthesis using Multilayer Displays with Directional Backlighting", Association for Computing Machinery (Jul. 2012); 11 pages.
International Search Report and Written Opinion for PCT Application No. PCT/US20/20183, dated Jun. 25, 2020.
Kanebako, et al., "Time-multiplexing display module for high-density directional display," SPIE—International Society for Optical Engineering, Proceedings, vol. 6803, Feb. 14, 2008.
Kim, "Full parallax multifocus three-dimensional display using a slanted light source array," Optical Engineering, vol. 50, No. 11, Nov. 1, 2011.
Kim, et al., "Development of three types of multi-focus 3D display," Proc. of SPIE vol. 8043, May 19, 2011.
Maimone, et al., "High Efficiency Near-Eye Light Field Display," ACM Trans. Graph, article, Nov. 1, 2013.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.

(56) References Cited

OTHER PUBLICATIONS

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

International Preliminary Report on Patentability for PCT Application No. PCT/US20/20183, dated Aug. 25, 2021.

\* cited by examiner

DISPLAY SYSTEM AND METHOD FOR PROVIDING VARIABLE ACCOMMODATION CUES USING MULTIPLE INTRA-PUPIL PARALLAX VIEWS FORMED BY LIGHT EMITTER ARRAYS

PRIORITY CLAIM

This application claims priority to: U.S. Provisional Application No. 62/812,142, filed on Feb. 28, 2019; and U.S. Provisional Application No. 62/815,225, filed on Mar. 7, 2019, which are incorporated herein by reference.

INCORPORATION BY REFERENCE

This application incorporates by reference the entirety of each of the following patent applications and publications: U.S. Application Publ. No. 2018/0113311, published Apr. 26, 2018; U.S. application Ser. No. 14/555,585, filed on Nov. 27, 2014; U.S. application Ser. No. 14/690,401, filed on Apr. 18, 2015; U.S. application Ser. No. 14/212,961, filed on Mar. 14, 2014; U.S. application Ser. No. 14/331,218, filed on Jul. 14, 2014; U.S. application Ser. No. 15/072,290, filed on Mar. 16, 2016; and WO 2016/179246, published Nov. 10, 2016; and U.S. Prov. Application No. 62/800,363, filed Feb. 1, 2019.

BACKGROUND

Field

The present disclosure relates to optical devices, including augmented reality and virtual reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by, which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In some embodiments, a head-mounted display system is provided. The display system includes an image projection system comprising: a micro-display configured to output image light defining images; and projection optics configured to direct the image light from the micro-display for propagation to an eye of a viewer. The display system also comprises an array of selectively-activated shutters for selectively transmitting the image light to the eye from different locations. The array of selectively-activated shutters is disposed within an eye-box volume of the projection optics.

In some other embodiments, a method for displaying image content is provided. The method comprises injecting, from a head-mounted display system, a set of parallactically-disparate intra-pupil images of a virtual object into an eye of a viewer. Each image of the intra-pupil images is provided by: forming the image on a micro-display of the head-mounted display system; outputting image light from the micro-display through projection optics; and opening a shutter of an array of shutters to propagate image light through the opened shutter to the eye. The array of shutters is disposed within an eye box volume of the projection optics. Different images of the set of parallactically-disparate intra-pupil images propagate through different opened shutters.

In yet other embodiments, a head-mounted display system is provided. The display system comprises a micro-display comprising an array of groups of light emitters; an array of light collimators overlying the light emitters; and projection optics. Each light collimator is associated with one of the groups of light emitters and extends across all light emitters of the associated group of light emitters. The array of light collimators is between the light emitters and the projection optics. The display system is configured to display a virtual object on a depth plane by injecting a set of parallactically-disparate intra-pupil images of the object into an eye of a viewer.

In some other embodiments, a method for displaying image content is provided. The method comprises injecting, from a head-mounted display system, a set of parallactically-disparate intra-pupil images into an eye of a viewer. Injecting the set of parallactically-disparate intra-pupil images comprises: providing an array of groups of light emitters; providing an array of light collimators overlying the light emitters, wherein each light collimator is associated with a group of the light emitters; providing projection optics, wherein the array of light collimators is between the array of groups of light emitters and the projection optics, injecting a first parallactically-disparate intra-pupil image into the eye by emitting light from a first light emitter of the groups of light emitters; and injecting a second parallactically-disparate intra-pupil image into the eye by emitting light from a second light emitter of the groups of light emitters.

In addition, various innovative aspects of the subject matter described in this disclosure may be implemented in the following examples:

Example 1

A head-mounted display system comprising:
an image projection system comprising:
  a micro-display configured to output image light defining images; and
  projection optics configured to direct the image light from the micro-display for propagation to an eye of a viewer; and
an array of selectively-activated shutters for selectively transmitting the image light to the eye from different locations, wherein the array of selectively-activated shutters is disposed within an eye-box volume of the projection optics.

Example 2

The display system of Example 1, further comprising a control system comprising one or more processors and memory storing instructions that, when executed by the one or more processors, cause the display system to perform operations comprising:
  determining a desired depth plane for a virtual object;
  determining shutters of the array of selectively-activated shutters to be opened based upon the desired depth plane;
  synchronizing presentation of different images, by the image projection system, with opening of different ones of the shutters, wherein the different images provide different views of the virtual object.

Example 3

The display system of any of Examples 1 or 2, wherein the shutters are moveable physical structures.

Example 4

The display system of Example 3, wherein the physical structures are mems-based micro-mechanical structures.

Example 5

The display system of Example 3, wherein the shutters are ferro-electric shutters.

Example 6

The display system of any of Examples 1 or 2, wherein the shutters comprise chemical species having reversibly changeable states, the states providing different amounts of light transmission.

Example 7

The display system of Example 6, wherein the chemical species comprise liquid crystals, wherein the shutters are formed by pixels of a pixelated liquid crystal display.

Example 8

The display system of any of Examples 1-7, wherein the micro-display is an emissive micro-display comprising an array of light emitters.

Example 9

The display system of Example 8, wherein the light emitters are micro-LEDs.

Example 10

The display system of any of Examples 1-9, further comprising an array of light collimators between the light emitters and the projection optics.

Example 11

The display system of Example 10, wherein each of the array of light collimators extends across a plurality of the light emitters, wherein each light collimator corresponds to a pixel in images outputted by the image projection system.

Example 12

The display system of any of Examples 1-11, wherein the micro-display is one of a plurality of monochrome micro-displays forming the projection system, wherein each of the monochrome micro-displays is configured to emit light of a different component color.

Example 13

The display system of Example 12, further comprising an X-cube prism, wherein each of the monochrome micro-displays is arranged to output image light into a different face of the X-cube prism.

Example 14

The display system of any of Examples 1-13, further comprising a pupil relay combiner eyepiece configured to relay the image light to the eye of the viewer, wherein the array of selectively-activated shutters are configured to regulate propagation of the image light to the pupil relay combiner eyepiece.

Example 15

The display system of Example 14, wherein the pupil relay combiner eyepiece comprises a waveguide comprising:
  in-coupling optical elements for in-coupling the image light into the waveguide; and
  out-coupling optical elements for out-coupling in-coupled image light out of the waveguide.

Example 16

The display system of Example 15, wherein the waveguide is one of a plurality of waveguides comprising in-coupling optical elements and out-coupling optical elements.

Example 17

The display system of any of Examples 1-16, wherein the projection system has a pupil diameter of 0.2-0.5 mm.

Example 18

A method for displaying image content, the method comprising:
  injecting, from a head-mounted display system, a set of parallactically-disparate intra-pupil images of a virtual object into an eye of a viewer,
  wherein each image of the intra-pupil images is provided by:
    forming the image on a micro-display of the head-mounted display system;
    outputting image light from the micro-display through projection optics; and
    opening a shutter of an array of shutters to propagate image light through the opened shutter to the eye, wherein the array of shutters is disposed within an eye box volume of the projection optics,
    wherein different images of the set of parallactically-disparate intra-pupil images propagate through different opened shutters.

Example 19

The method of Example 18, wherein all images of the set of parallactically-disparate intra-pupil images are injected into the eye within a flicker fusion threshold.

Example 20

The method of Example 18, wherein the flicker fusion threshold is 1/60 of a second.

Example 21

The method of any of Examples 18-20, further comprising:
  determining a desired depth plane for the virtual object to be displayed to the viewer;
  determining shutters of the array of selectively-activated shutters to be opened based upon the desired depth plane; and
  synchronizing presentation of different ones of the set of parallactically-disparate intra-pupil images with opening of different ones of the shutters.

Example 22

The method of any of Examples 18-21, further comprising:
  determining a gaze of the eye using an eye tracking sensor; and
  selecting content for the intra-pupil images based upon the determined gaze of the eye.

Example 23

The method of any of Examples 18-22, wherein the micro-display is an emissive micro-display.

Example 24

The method of any of Examples 18-23, wherein the array of shutters comprises selectively-movable physical structures.

Example 25

The method of any of Examples 18-23, wherein the array of shutters comprises chemical species having reversibly changeable states, the states providing different amounts of light transmission.

Example 26

The method of any of Examples 18-25, wherein the different images provide different views of the virtual object.

Example 27

A head-mounted display system comprising:
  a micro-display comprising an array of groups of light emitters;
  an array of light collimators overlying the light emitters, wherein each light collimator is associated with one of the groups of light emitters and extends across all light emitters of the associated group of light emitters;
  projection optics, wherein the array of light collimators is between the light emitters and the projection optics,
  wherein the display system is configured to display a virtual object on a depth plane by injecting a set of parallactically-disparate intra-pupil images of the object into an eye of a viewer.

Example 28

The display system of Example 27, further comprising one or more processors and memory storing instructions that, when executed by the one or more processors, cause the display system to perform operations comprising:
  determining light emitters of each of the groups of light emitters to activate based upon a desired level of parallax disparity for images formed by light emitters;
  activating a first light emitter of the groups of light emitters to form a first parallactically-disparate intra-pupil image; and
  activating a second light emitter of the groups of light emitters to form a second parallactically-disparate intra-pupil image,
  wherein the first and second parallactically-disparate intra-pupil images provide different views of the virtual object.

Example 29

The display system of Example 27, wherein activating the first light emitter of the groups of light emitters overlaps in time with activating the second light emitter of the groups of light emitters, to inject the first and second parallactically-disparate intra-pupil images into the eye simultaneously.

Example 30

The display system of any of Examples 27-29, wherein the light collimators are lenslets.

Example 31

The display system of any of Examples 27-30, further comprising an array of selectively-activated shutters for selectively transmitting the image light to the eye from different locations, wherein the array of selectively-activated shutters is disposed within an eye-box volume of the projection optics.

Example 32

The display system of Example 31, wherein the array of shutters comprises selectively-movable physical structures.

Example 33

The display system of Example 31, wherein the array of shutters comprises chemical species having reversibly changeable states, the states providing different amounts of light transmission.

Example 34

The display system of any of Examples 31-33, further comprising one or more processors and memory storing instructions that, when executed by the one or more processors, cause the display system to perform operations comprising:
  determining a desired depth plane for a virtual object;
  determining shutters of the array of selectively-activated shutters to be opened based upon the desired depth plane;
  synchronizing presentation of different images, by the image projection system, with opening of different ones of the shutters, wherein the different images provide different views of the virtual object.

Example 35

The display system of any of Examples 27-34, wherein the light collimators are lenticular lenslets configured to provide different beams of light, from light emitters of an associated group of light emitters, to different locations along a first axis,
  wherein the array of shutters are arranged to form sub-pupils along a second axis orthogonal to the first axis.

Example 36

The display system of any of Examples 27-35, wherein the micro-display is an emissive micro-display, wherein the light emitters are micro-LEDs.

Example 37

The display system of any of Examples 27-36, wherein the micro-display is one of a plurality of monochrome micro-displays, wherein each of the monochrome micro-displays is configured to emit light of a different component color.

Example 38

The display system of Example 37, further comprising an X-cube prism, wherein each of the monochrome micro-displays is arranged to output image light into a different face of the X-cube prism.

Example 39

The display system of any of Examples 27-38, further comprising a pupil relay combiner eyepiece configured to relay the image light to the eye of the viewer, wherein the array of selectively-activated shutters are configured to regulate propagation of the image light to the pupil relay combiner eyepiece.

Example 40

The display system of Example 39, wherein the pupil relay combiner eyepiece comprises a waveguide comprising:
  in-coupling optical elements for in-coupling the image light into the waveguide; and
  out-coupling optical elements for out-coupling in-coupled image light out of the waveguide.

Example 41

The display system of Example 40, wherein the waveguide is one of a plurality of waveguides comprising in-coupling optical elements and out-coupling optical elements.

Example 42

A method for displaying image content, the method comprising:
  injecting, from a head-mounted display system, a set of parallactically-disparate intra-pupil images into an eye of a viewer,
  wherein injecting the set of parallactically-disparate intra-pupil images comprises:
    providing an array of groups of light emitters;
    providing an array of light collimators overlying the light emitters, wherein each light collimator is associated with a group of the light emitters;
    providing projection optics, wherein the array of light collimators is between the array of groups of light emitters and the projection optics,
    injecting a first parallactically-disparate intra-pupil image into the eye by emitting light from a first light emitter of the groups of light emitters; and
    injecting a second parallactically-disparate intra-pupil image into the eye by emitting light from a second light emitter of the groups of light emitters.

Example 43

The method of Example 42, wherein each of the images of the set of parallactically-disparate intra-pupil images are injected into the eye at different angles and all images of the set of parallactically-disparate intra-pupil images are injected into the eye within a flicker fusion threshold.

Example 44

The method of Example 43, wherein the flicker fusion threshold is $1/60$ of a second.

Example 45

The method of any of Examples 42-43, wherein the different images provide different views of the virtual object.

Example 46

The method of any of Examples 42-45, wherein injecting the first parallactically-disparate intra-pupil image and injecting the second parallactically-disparate intra-pupil image are performed simultaneously.

Example 47

The method of any of Examples 42-46, further comprising providing an array of selectively-activated shutters for selectively transmitting the image light to the eye from different locations, wherein the array of selectively-activated shutters is disposed within an eye-box volume of the projection optics.

Example 48

The method of any of Examples 42-47, wherein the light collimators are lenticular lenslets configured to provide different beams of light, from light emitters of an associated group of light emitters, to different locations along a first axis, wherein the array of shutters are arranged to form subpupils along a second axis orthogonal to the first axis.

Example 49

The method of any of Examples 47-48, further comprising spatially-multiplexing multiple images formed by different light emitters of the groups of light emitters to localize a display subpupil along the first axis, and temporally-multiplexing multiple images by synchronizing opening of the shutters with activation of corresponding light emitters.

Example 50

The method of any of Examples 47-49, wherein the array of shutters comprises selectively-movable physical structures.

Example 51

The method of any of Examples 47-49, wherein the array of shutters comprises chemical species having reversibly changeable states, the states providing different amounts of light transmission.

Example 52

The method of any of Examples 42-51, wherein injecting the first parallactically-disparate intra-pupil image and injecting the second parallactically-disparate intra-pupil image comprise routing light from the light emitters to the eye through a pupil relay combiner eyepiece.

Example 53

The method of Example 52, wherein the pupil relay combiner eyepiece comprises a waveguide comprising:
   in-coupling optical elements for in-coupling the image light into the waveguide; and
   out-coupling optical elements for out-coupling in-coupled image light out of the waveguide.

Example 54

The method of any of Examples 42-53, further comprising injecting, from the head-mounted display system, a second set of parallactically-disparate intra-pupil images into a second eye of a viewer.

DETAILED DESCRIPTION

Figure 1:
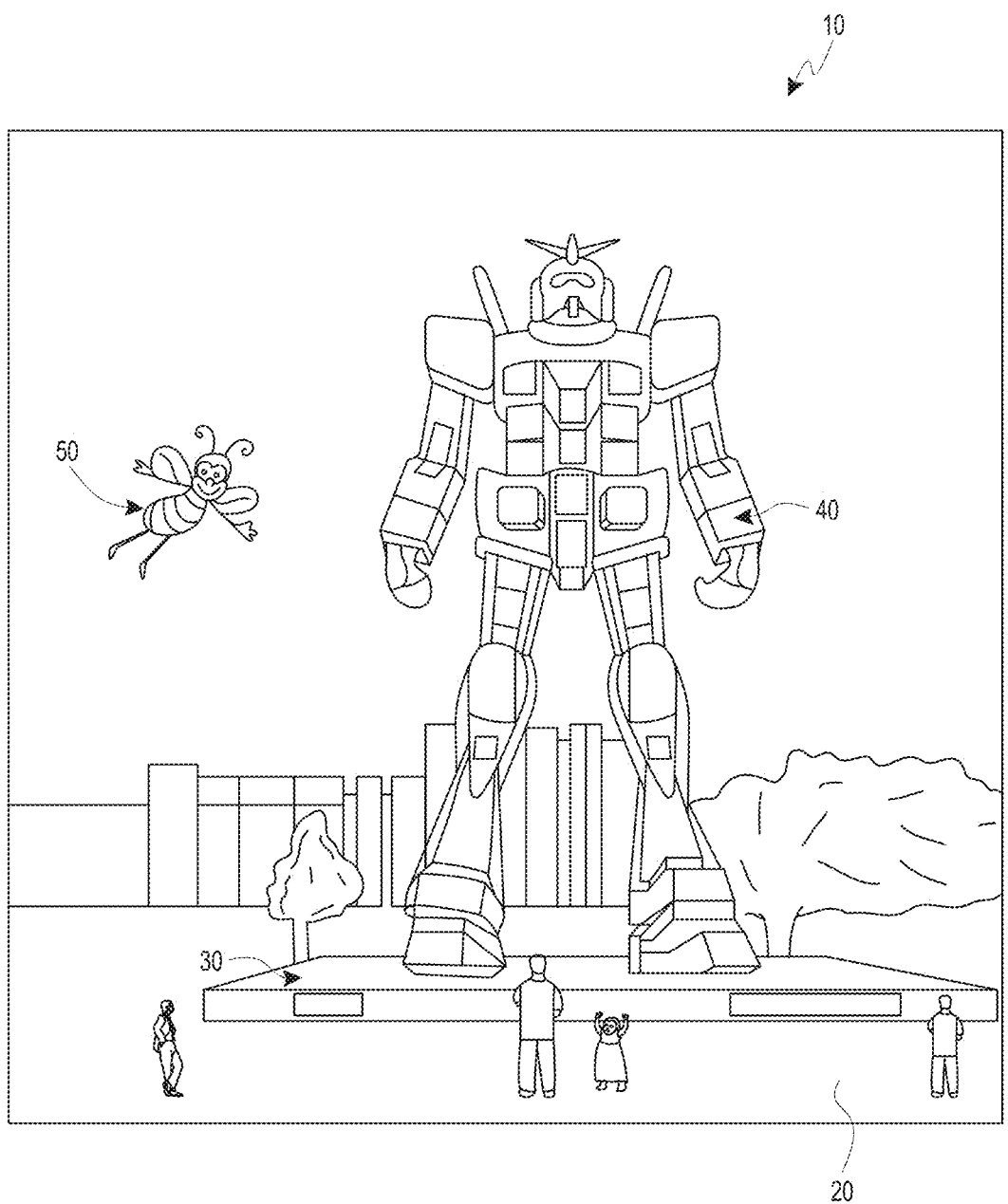
FIG. 1 illustrates a user's view of augmented reality (AR) through an AR device.

The human visual system may be made to perceive images presented by a display as being "3-dimensional" by providing slightly different presentations of the image to each of a viewer's left and right eyes. Depending on the images presented to each eye, the viewer perceives a "virtual" object in the images as being at a selected distance (e.g., at a certain "depth plane") from the viewer (also referred to as "user" herein). Simply providing different presentations of the image to the left and right eyes, however, may cause viewer discomfort. As discussed further herein, viewing comfort may be increased by causing the eyes to accommodate to the images as the eyes would accommodate to a real object at the depth plane on which the virtual object is placed.

The proper accommodation for a virtual object on a given depth plane may be elicited by presenting images to the eyes with light having a wavefront divergence that matches the wavefront divergence of light coming from a real object on that depth plane. Some display systems use distinct structures having distinct optical powers to provide the appropriate wavefront divergence. For example, one structure may provide a specific amount of wavefront divergence (to place virtual objects on one depth plane) and another structure may provide a different amount of wavefront divergence (to place virtual objects on a different depth plane). Thus, there may be a one-to-one correspondence between physical structures and the depth planes in these display systems. Due to the need for a separate structure for each depth plane, such display systems may be bulky and/or heavy, which may be undesirable for some applications, such as portable head-mounted displays. In addition, such display systems may be limited in the numbers of different accommodative responses they may elicit from the eyes, due to practical limits on the number of structures of different optical powers that may be utilized.

It has been found that a continuous wavefront, e.g. a continuous divergent wavefront, may be approximated by injecting parallactically-disparate intra-pupil images directed into an eye. For example, a display system may provide a range of accommodative responses without requiring a one-to-one correspondence between the accommodative response and the optical structures in the display. The display system may output light with a selected amount of perceived wavefront divergence, corresponding to a desired depth plane, by injecting a set of parallactically-disparate intra-pupil images into the eye. These images may be referred to as "parallactically-disparate" intra-pupil images since each image may be considered to be a different parallax view of the same virtual object or scene, on a given depth plane. These are "intra-pupil" images since a set of images possessing parallax disparity is projected into the pupil of a single eye, e.g., the right or left eye of a viewer. Although the images may have some overlap, the light beams forming these images will have at least some areas without overlap and will impinge on the pupil from slightly different angles. In some embodiments, the other eye of the viewer, e.g., the left eye, may be provided with its own set of parallactically-disparate intra-pupil images. The sets of parallactically-disparate intra-pupil images projected into each eye may be slightly different, e.g., the images may show slightly different views of the same scene due to the slightly different perspectives provided by each eye.

The wavefronts of light forming each of the intra-pupil images of the different views, when projected into a pupil of an eye, may, in the aggregate, approximate a continuous divergent wavefront. The amount of perceived divergence of this approximated wavefront may be varied by varying the amount of parallax disparity between the intra-pupil images; changes in the parallax disparity change the angular range spanned by the wavefronts of light forming the intra-pupil images. Preferably, this angular range mimics the angular range spanned by the continuous wavefront being approximated. In some embodiments, the wavefronts of light forming the individual intra-pupil images are collimated or quasi-collimated, as discussed herein. Examples of systems for providing intra-pupil images are disclosed in U.S. Application Publ. No. 2018/0113311 published Apr. 26, 2018. Some embodiments disclosed in that application utilize light emitters to illuminate a spatial light modulator which encodes light from the light emitters with image information; multiple light emitters may be provided and the different intra-pupil images may be formed using light emitters at different locations to provide desired amounts of parallax disparity between images.

Preferably, the set of intra-pupil images for approximating a particular continuous wavefront is injected into the eye sufficiently rapidly for the human visual system to not detect that the images were provided to the eye at different times. Without being limited by theory, the term flicker fusion threshold may be used to denote the duration within which images presented to the human eye are perceived as being present simultaneously; that is, the visual system may perceive images formed on the retina within a flicker fusion threshold as being present simultaneously. In some embodiments, approximating a continuous wavefront may include sequentially injecting beams of light for each of a set of intra-pupil images into the eye, with the total duration for injecting all of the beams of light being less than the flicker fusion threshold. It will be appreciated that presenting the set of images over a duration greater than the flicker fusion threshold may result in the human visual system perceiving at least some of the images as being separately injected into the eye. As an example, the flicker fusion threshold may be about 1/60 of a second. Consequently, each set of intra-pupil images may consist of a particular number of parallax views, e.g., two or more views, three or more views, four or more views, etc. and preferably all of these views are provided to the eye within the flicker fusion threshold.

Providing all of the desired views within the flicker fusion threshold presents a challenge for some display technologies, such as those using spatial light modulators in which physical elements are moved to modulate the intensity of outputted light. The need to physically move these elements may limit the speed at which individual pixels may change states and also constrains the frame rate of displays using these optical elements. In addition, spatial light modulators may require a separate light source, which can undesirably add to the complexity, size, and weight of the display system, and may potentially limit the brightness of displayed images.

In some embodiments, a display system includes an emissive micro-display, which advantageously may provide different intra-pupil images at exceptionally high rates. In addition, the display system may include an array of shutters. The shutters of the array of shutters may be individually selectively opened, or activated to allow light transmission, to allow light to propagate into the retina from different locations. The emissive micro-display emits image light for forming an intra-pupil images and the image light propagates to the array of shutters. Different ones of the shutters at different locations may be selectively opened (made transmissive to the image light) to allow the image light to further propagate into a viewer's eye from those different locations. The amount of parallax disparity between the intra-pupil images may be varied by changing the locations at which an shutter is opened. Consequently, spatial differences in the opened shutter locations may translate into differences in the paths that the light takes into the eye. The different paths may correspond to different amounts of parallax disparity. In some embodiments, an array of light collimators may be disposed proximate the emissive micro-display. For example, each pixel of the emissive micro-display may have an associated light collimator. The light collimators narrow the angular emission profile of light emitted by the emissive micro-display, and thereby nay increase the amount of the emitted light that ultimately reaches the eyes of the viewer.

It will be appreciated that the images formed by the emissive micro-display may be temporally synchronized with the shutter that is opened in the array of shutters. For example, the opening of one shutter (or multiple adjacent or contiguous shutters) corresponding to one intra-pupil image may be synchronized, or simultaneous, with the activation of pixels in the micro-display. Once another shutter, at a location desired for a second intra-pupil image, is opened, the micro-display may emit light for forming that second intra-pupil image. Additional intra-pupil images may be formed by synchronizing with the opening of shutters at different locations. This time-based sequential injection of intra-pupil images to the eye may be referred to as temporal multiplexing or temporally multiplexed display of the intra-pupil images. As a result, in some embodiments, the presentation of the intra-pupil images by the micro-display may be temporally multiplexed, such that different parallax views may be provided by the emissive micro-display at different times and synchronized with the opening of different shutters providing the desired parallax disparity.

Preferably, the emissive micro-displays are micro-LED displays, which provide advantages for high brightness and high pixel density. In some other embodiments, the micro-displays are micro-OLED displays.

In some embodiments, the emissive micro-displays comprise arrays of light emitters having a pitch of, e.g., less than 10 µm, less than 8 µm, less than 6 µm, less than 5 µm, or less than 2 µm, including 1-5 µm, 1-4 µm or 1-2 µm; and an emitter size of 2 µm or less, 1.7 µm or less, or 1.3 µm or less. In some embodiments, the emitter size is within a range having an upper limit of the above-noted sizes and a lower limit of 1 µm. Examples of the ratio of emitter size to pitch include 1:1 to 1:5, 1:2 to 1:4, or 1:2 to 1:3, In some embodiments, the display system may utilize an emissive micro-display in conjunction with a light collimator array to provide different amounts of parallax disparity.

The collimator array may be configured to direct light, emitted by the micro-display, along different paths which correspond to the different amounts of parallax disparity. For example, the collimator array may be positioned proximate to or directly on the emissive micro-display. In some embodiments, the light collimators are lenslets. Each collimator of the collimator array may include a group of associated subpixels, each disposed at a different location relative to the collimator. As a result, light from different subpixels of the group of subpixels interfaces differently with the collimator and is directed along slightly different paths by the collimator. These different paths may correspond to different amounts of parallax disparity. Thus, each collimator may correspond to a different pixel of an intra-pupil image, and each subpixel may provide a different light path for that pixel, such that the parallax disparity between two or more pixels may be selected by appropriate activation of the sub-pixels forming those pixels. In some embodiments, advantageously, different intra-pupil images may be formed and provided to the eye simultaneously, with the parallax disparity determined by the locations of the sub-pixels forming the images and with the collimator array directing the propagation of light from those subpixels.

As noted above, light from different subpixels will take different paths to the projection optic and thus to the viewer's eyes. Consequently, lateral and/or vertical displacement of the active subpixels translates into angular displacement in the light leaving the light collimator array and ultimately propagating towards the viewer's pupil through the projection optic. In some embodiments, increases in lateral displacement between the activated subpixels used to form different images may be understood to translate to increases in angular displacement as measured with respect to the micro-display. In some embodiments, each of the intra-pupil images, used to approximate a particular wavefront, may be formed by outputting light from a different subpixel, thereby providing the angular displacement between the beams of light forming each of the images.

In some embodiments, the display systems, whether utilizing a collimator array or an array of shutters, may include projection optics for injecting light into the eye. The emissive micro-display may be configured to output the light, encoded with image information, to form an intra-pupil image. Light subsequently impinges on and propagates through the projection optics and, ultimately, to the eye of a viewer.

In some embodiments, the display system may include a combiner eyepiece, which allows virtual image content to be overlaid with the viewer's view of the world, or ambient environment. For example, the combiner eyepiece may be an optically transmissive waveguide that allows the viewer to see the world. In addition, the waveguide may be utilized to receive, guide, and ultimately output light, forming the intra-pupil images, to the viewer's eyes. Because the waveguide may be positioned between the viewer and the world, the light outputted by the waveguide may be perceived to form virtual images that are placed on various depth planes in the world. In essence, the combiner eyepiece allows the viewer to receive a combination of light from the display system and light from the world.

In some embodiments, the display system may also include an eye tracking system to detect the viewer's gaze direction. Such an eye tracking system allows appropriate content to be selected and displayed based upon where the viewer is looking.

Preferably, the display system has a sufficiently small exit pupil that the depth of field provided by light forming individual intra-pupil images is substantially infinite and the visual system operates in an "open-loop" mode in which the eye is unable to accommodate to an individual intra-pupil image. In some embodiments, the light beams forming individual images occupy an area having a width or diameter less than about 0.5 mm when incident on the eye. It will be appreciated, however, that light beams forming a set of intra-pupil images are at least partially non-overlapping and the set of light beams preferably define an area larger than 0.5 mm, to provide sufficient information to the lens of the eye to elicit a desired accommodative response based on the wavefront approximation formed by the wavefronts of the light forming the intra-pupil images.

Without being limited by theory, the area defined by a set of beams of light may be considered to mimic a synthetic aperture through which an eye views a scene. It will be appreciated that viewing a scene through a sufficiently small pinhole in front of the pupil provides a nearly infinite depth of field. Given the small aperture of the pinhole, the lens of the eye is not provided with adequate scene sampling to discern distinct depth of focus. As the pinhole enlarges, additional information is provided to the eye's lens, and natural optical phenomena allow a limited depth of focus to be perceived. Advantageously, the area defined by the set of beams of light and the corresponding sets of parallactically-disparate intra-pupil images may be made larger than the pinhole producing the infinite depth of field and the multiple intra-pupil images may produce an approximation of the effect provided by the enlarged pinhole noted above.

Some embodiments disclosed herein may provide various advantages. For example, because the micro-displays are emissive, no external illumination is required, thereby facilitating reductions in the size and weight of the projection system. The small size of these micro-displays allows the use of a single projector with separate component color (e.g., red, green, blue) micro-display panels, without requiring an unduly large or complicated projector. In some embodiments, because of the advantageously small size and weight of various micro-display disclosed herein, different projectors may be used for different component colors. In addition, in contrast to typical displays, such as LCOS displays, polarization is not needed to provide light with image information. As a result, light loss associated with polarization may be avoided. Also, the individual light emitters of the micro-displays have high etendue and, as a result, light from each pixel naturally fills a large super-pupil area, which can provide a desirably large eye-box volume. In some embodiments, the emissive micro-display is a micro-LED display, which may have exceptionally high frame rates (e.g., frame rate of 1 kHz or more, including 1-2 kHz). In addition, the emissive micro-displays may have exceptionally small pixel pitches (e.g., 1-4 µm, including 2-4 µm or 1-2 µm) and high pixel density, which may provide desirably high image resolutions.

Reference will now be made to the figures, in which like reference numerals refer to like parts throughout.

Figure 2:
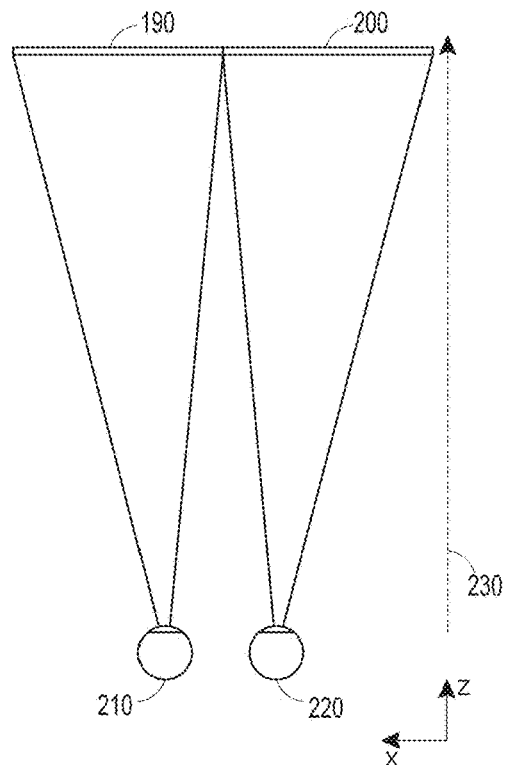
FIG. 2 illustrates a conventional scheme for simulating three-dimensional imagery for a user.

As discussed herein, the perception of an image as being "three-dimensional" or "3-D" may be achieved by providing slightly different presentations of the image to each eye of the viewer. FIG. 2 illustrates a conventional scheme for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display schemes rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive objects as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes (or accommodating the eyes) from one object to another object at a different distance will automatically cause a matching change in vergence to the same distance, under a relationship known as the "accommodation-vergence reflex". Likewise, under normal conditions, a change in vergence will trigger a matching change in accommodation, with changes in lens shape and pupil size. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene; the eyes view all the image information at a single accommodated state, even image information for objects at different depths. This, however, which works against the "accommodation-vergence reflex." Display systems that provide a better match between accommodation and vergence may form more realistic and comfortable simulations of three-dimensional imagery, which may facilitate users wearing the displays for longer durations.

Figure 3:
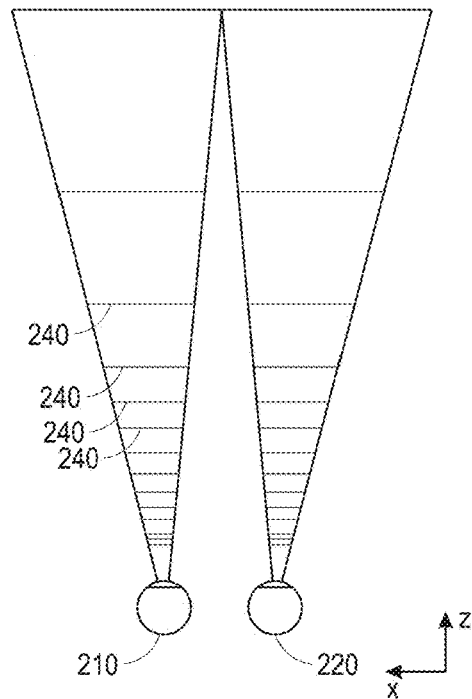
FIG. 3 illustrates aspects of an approach for simulating three-dimensional imagery using multiple depth planes.

FIG. 3 illustrates aspects of an approach for simulating three-dimensional imagery using multiple depth planes. Objects at various distances from eyes 210, 220 on the z-axis are accommodated by the eyes 210, 220 so that those objects are in focus; that is, the eyes 210, 220 assume particular accommodated states to bring into focus objects at different distances along the z-axis. Consequently, a particular accommodated state may be said to be associated with a particular one of depth planes 240, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, with the presentations of the image also being different for different depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 4A:
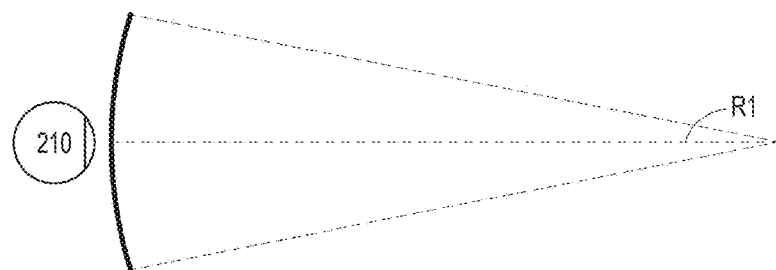
FIGS. 4A-4C illustrate relationships between wavefront curvature and focal distance.
Figure 4B:
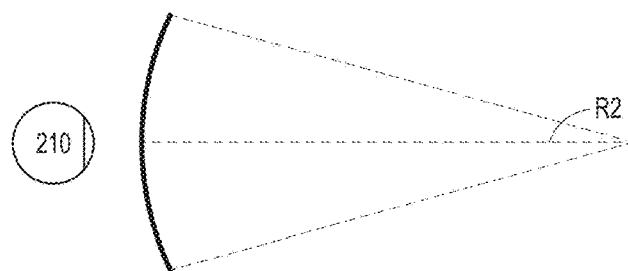
Figure 4C:
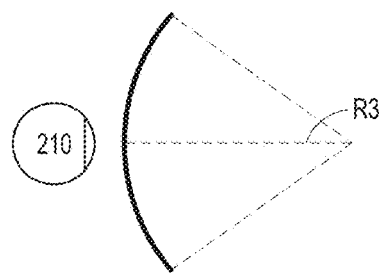

The distance between an object and the eye 210 or 220 may also change the amount of divergence of light from that object, as viewed by that eye. FIGS. 4A-4C illustrate relationships between distance and the divergence of light rays. The distance between the object and the eye 210 is represented by, in order of decreasing distance, R1, R2, and R3. As shown in FIGS. 4A-4C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 4A-4C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features in the scene, where the different features are located on different depth planes. This may also cause other image features on other depth planes to appear out of focus, which provides an additional sense of depth for the viewer.

Figure 5:
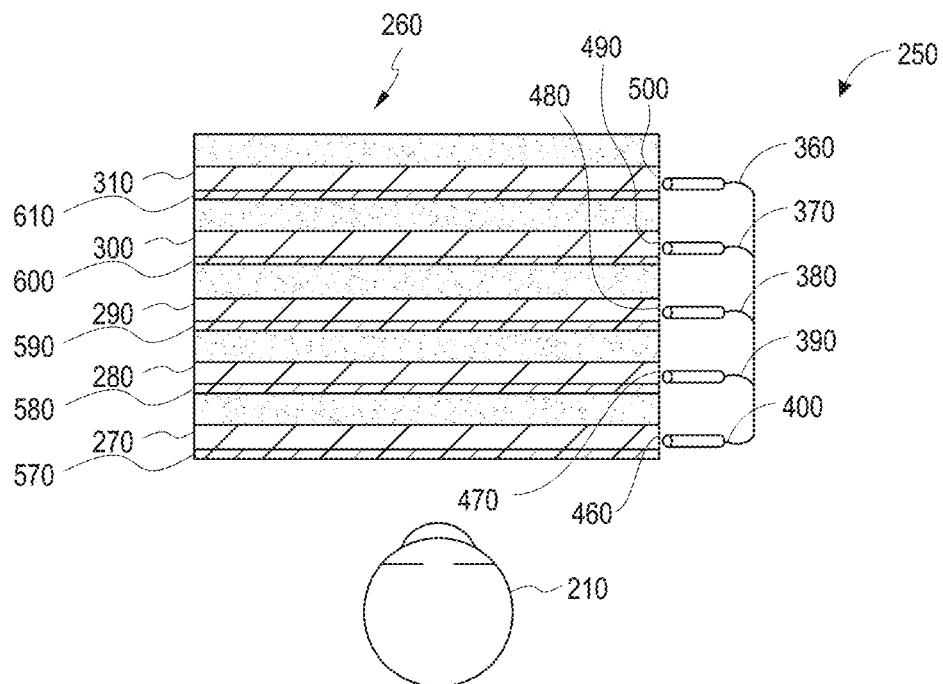
FIG. 5 illustrates an example of a waveguide stack for outputting image information to a user.

Because each depth plane has an associated wavefront divergence, to display image content appearing to be at a particular depth plane, some displays may utilize waveguides that have optical power to output light with a wavefront divergence corresponding to that depth plane. A plurality of similar waveguides, but having different optical powers, may be utilized to display image content on a plurality of depth planes. For example, such systems may utilize a plurality of such waveguides formed in a stack. FIG. 5 illustrates an example of a waveguide stack for outputting image information to a user. A display system 250 includes a stack of waveguides 260 that may be utilized to provide three-dimensional perception to the eye/brain using a plurality of waveguides 270, 280, 290, 300, 310 to output image information. Image injection devices 360, 370, 380, 390, 400 may be utilized to inject light containing image information into the waveguides 270, 280, 290, 300, 310. In some embodiments, the image injection devices 360, 370, 380, 390, 400 may be understood to be different light projection systems and/or different pupils of one or more projection systems. The waveguides 270, 280, 290, 300, 310 may be separated from other waveguides by, e.g., air or other low refractive index material which facilitates total internal reflection of light through individual ones of the waveguides. Each waveguide 270, 280, 290, 300, 310 may include a structure (e.g., an optical grating and/or lens 570, 580, 590, 600, 610, respectively) that provides optical power, such that each waveguide outputs light with a preset amount of wavefront divergence, which corresponds to a particular depth plane. Thus, each waveguide 270, 280, 290, 300, 310 places image content on an associated depth plane determined by the amount of wavefront divergence provided by that waveguide.

It will be appreciated, however, that the one-to-one correspondence between a waveguide and a depth plane may lead to a bulky and heavy device in systems in which multiple depth planes are desired. In such embodiments, multiple depth planes would require multiple waveguides. In addition, where color images are desired, even larger numbers of waveguides may be required, since each depth plane may have multiple corresponding waveguides, one waveguide for each component color (e.g., red, green, or blue) may be required to form the color images.

Advantageously, various embodiments herein may provide a simpler display system that approximates a desired continuous wavefront by using discrete light beams that form intra-pupil images that present different parallax views of an object or scene. Moreover, the light projection system utilizes emissive micro-displays, which may reduce the size and weight of the display system relative to projection systems utilizing separate spatial light modulators and light sources. In addition, some embodiments provide exceptionally high frame rates, which may provide advantages for flexibility in providing desired numbers of intra-pupil images within a given duration.

Figure 6A:
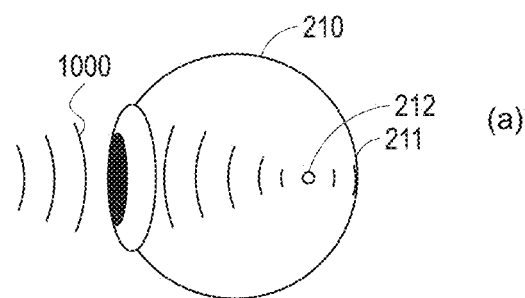
FIG. 6A illustrates pre-accommodation and post-accommodation conditions of an eye for a continuous incoming wavefront.

With reference now to FIG. 6A, the pre-accommodation and post-accommodation conditions of an eye 210 upon receiving a continuous input wavefront 1000 are illustrated. Illustration a) shows the pre-accommodation condition, before the visual system brings the wavefront 1000 into focus on the retina 211. Notably, the focal point 212 is not on the retina 211. For example, the focal point 212 may be forward of the retina 211 as illustrated. Illustration b) shows the post-accommodation condition, after the human visual system flexes pupillary musculature of the eye 210 of the viewer to bring the wavefront 1000 into focus on the retina 211. As illustrated, the focal point 212 may be on the retina 211.

Figure 6A:
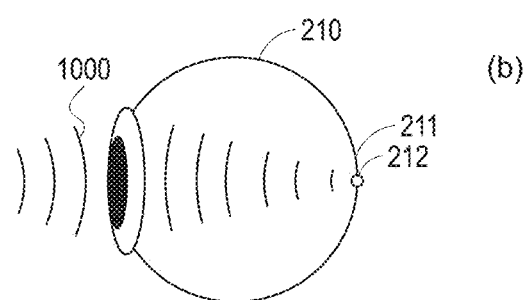
Figure 6B:
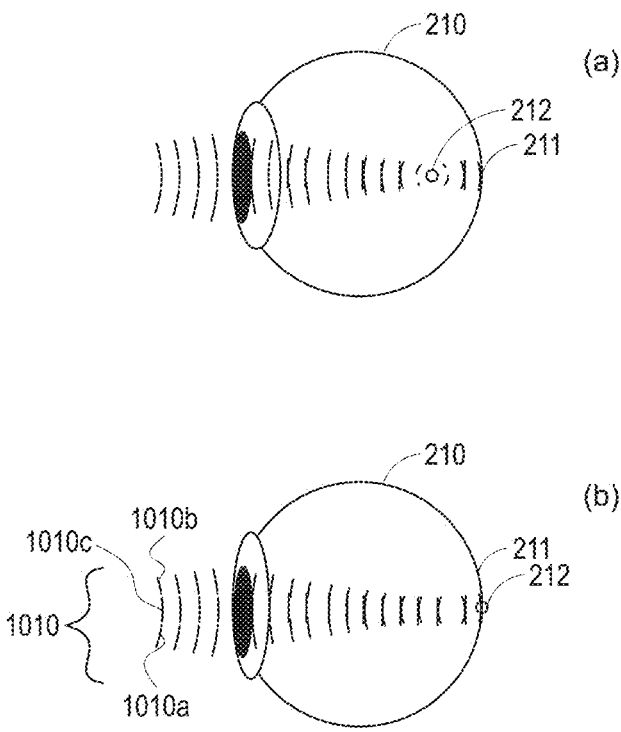
FIG. 6B illustrates pre-accommodation and post-accommodation conditions of an eye to a piecewise approximation for a continuous incoming wavefront.

It has been found that a continuous wavefront such as the wavefront 1000 of FIG. 6A may be approximated using a plurality of wavefronts. FIG. 6B illustrates the pre-accommodation and post-accommodation conditions of the eye 210 upon receiving a piecewise approximation of the continuous wavefront 1000 of FIG. 6A. Illustration a) of FIG. 6B shows the pre-accommodation condition and illustration b) shows the post-accommodation condition of the eye 210. The approximation may be formed using a plurality of constituent wavefronts 1010a, 1010b, and 1010c, each of which is associated with separate beams of light. As used herein, references numerals 1010a, 1010b, and 1010c may indicate both a light beam and that light beam's associated wavefront. In some embodiments, the constituent wavefronts 1010a and 1010b may be planar wavefronts, such as formed by a collimated beam of light. As shown in illustration b), the wavefront approximation 1010 formed by the constituent wavefronts 1010a and 1010b are focused by the eye 210 onto the retina 211, with the focal point 212 on the retina 211. Advantageously, the pre- and post-accommodation conditions are similar to that caused by the continuous wavefront 1000 shown in FIG. 6A.

Figure 7A:
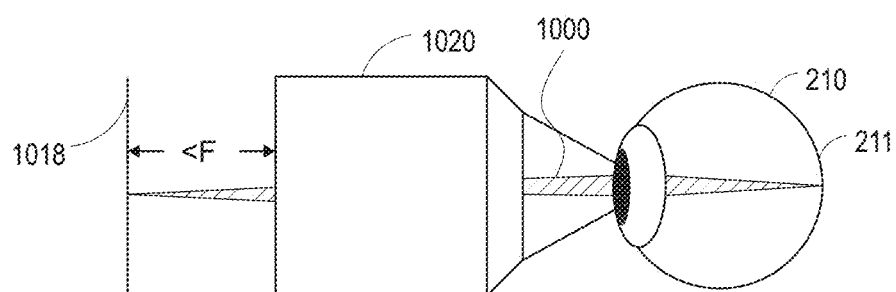
FIG. 7A illustrates an eye accommodating to a divergent wavefront emanating from a finite focal-distance virtual image provided by a projection system.

It will be appreciated that continuous divergent wavefronts may be formed using optical projection systems. As noted above, U.S. Application Publ. No. 2018/0113311, published Apr. 26, 2018, discloses examples of systems using a light source to illuminate a spatial light modulator 1018. FIG. 7A illustrates an eye accommodating to a divergent wavefront emanating from a finite focal-distance virtual image provided by a projection system. The system includes spatial light modulator 1018 and projection optics 1020 with focal length "F" and an external stop. A light source (not illustrated) provides light to the spatial light modulator 1018 and an image may be formed by the spatial light modulator 1018 by modulating the light. The modulated light containing image information may be directed through projection optics 1020 to the eye 210. As indicated in FIG. 7A, the spacing (less than F) between the micro-display 2000 and the projection optics 1020 may be chosen such that a divergent wavefront 1000 is outputted towards the eye 210. As noted above regarding FIG. 6A, the eye 210 may then focus the wavefront 1000 on the retina 211.

Figure 7B:
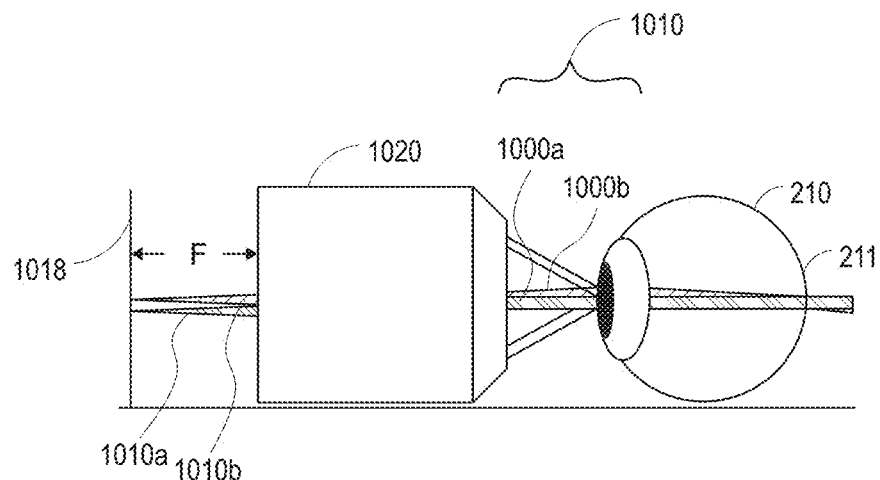
FIG. 7B illustrates a system for forming an approximation of the divergent wavefront of FIG. 7A utilizing wavefront segments formed by infinity-focused virtual images.

FIG. 7B illustrates a system for forming an approximation of the divergent wavefront of FIG. 7A utilizing wavefront segments formed by infinity-focused virtual images. As above, the system includes spatial light modulator 1018 and projection optics 1020. As above, a light source (not illustrated) provides light to the spatial light modulator 1018, which modulates the light to form images. The spatial light modulator 1018 may form two images that are shifted relative to one another. The spatial light modulator 1018 is placed at distance F from the back focal plane of projection optics 1020, which have a back focal length of F. Light beam 1010a, containing image information for a first image, propagates through the projection optics 1020 into the eye 210. Light beam 1010b containing image information for a second image takes a different path through the projection optics 1020 into the eye 210. The light beams 1010a and 1010b propagate away from the spatial light modulator along paths through the projection optics 1020 and into the eye 210 such that those light beams define an angular range, from one light beam to the other, that matches the angular range of the divergent wavefront 1000 (FIG. 7A). It will be appreciated that the angular separation between light beams 1010a and 1010b increases with increases in the amount of wavefront divergence that is approximated.

Figure 8:
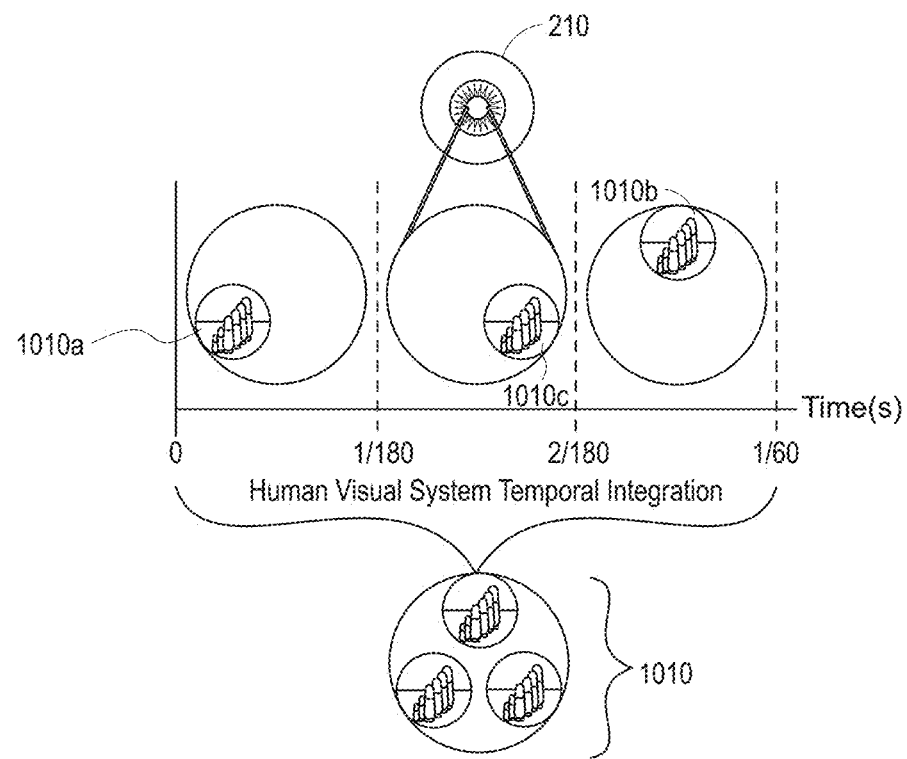
FIG. 8 illustrates examples of parallax views forming the divergent wavefront approximation of FIG. 7B.

With reference now to FIG. 8, examples of parallax views forming the divergent wavefront approximation of FIG. 7B are illustrated. It will be appreciated that each of light beams 1010a, 1010b, and 1010c form a distinct image of one view of the same objects or scene from slightly different perspectives corresponding to the different placements of the images in space. As illustrated, the images may be injected into the eye 210 sequentially at different times. Alternatively, the images may be injected simultaneously if the optical system permits, or a group of images may be simultaneously injected, as discussed herein. In some embodiments, the total duration over which light forming all of the images is injected into the eye 210 is less than the flicker fusion threshold of the viewer. For example, the flicker fusion threshold may be 1/60 of a second, and all of the light beams 1010a, 1010b, and 1010c are injected into the eye 210 over a duration less than that flicker fusion threshold. As such, the human visual system integrates all of these images and they appear to the eye 210 as if the light beams 1010a, 1010b, and 1010c were simultaneously injected into that eye 210. The light beams 1010a, 1010b, and 1010c thus form the wavefront approximation 1010.

Figure 9:
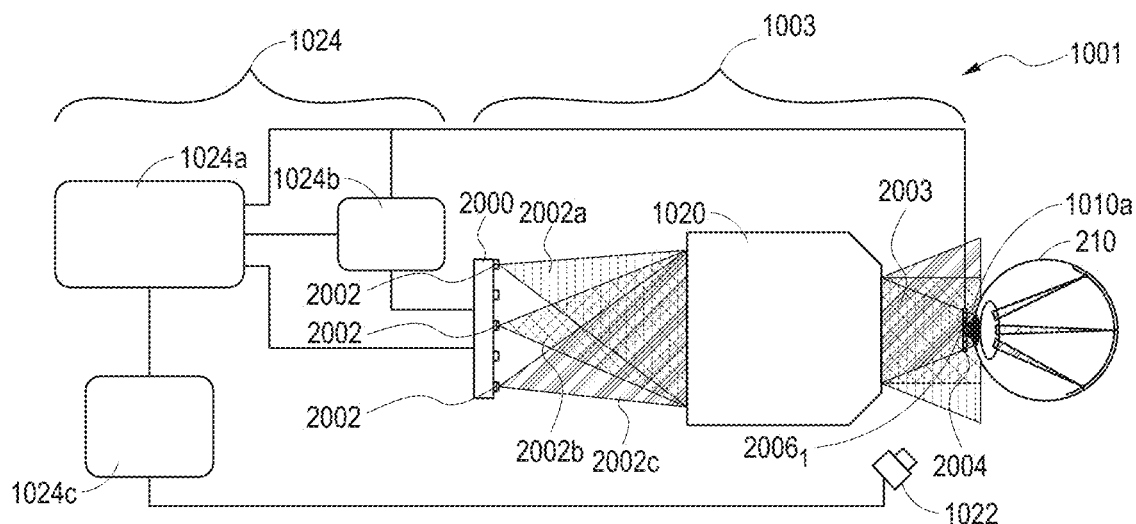
FIG. 9 illustrates an example of a display system comprising a projection system for forming the divergent wavefront approximation of FIGS. 7B and 8.

With reference now to FIG. 9, an example is illustrated of a display system 1001 comprising a projection system 1003 for forming the divergent wavefront approximation 1010 of FIGS. 7B and 8. The projection system 1003 comprises a micro-display 2000 comprising a plurality of light emitters 2002, which function as pixels for forming images. The light emitters 2002 emit light 2002a, 2002b, 2002c, which propagate through the relay/projection optics 1020, and is outputted by the relay/projection optics 1020. The light then continues through an open shutter $2006_1$ of an array 2004 of shutters. The open shutter $2006_1$ may be understood to form a shutter-aperture sub-pupil. In addition, the light propagating through the open shutter $2006_1$ may be understood to be a light beam 1010a, which propagates into the eye 210 to form an intra-pupil image (see, e.g., the image by formed by the beam of light 1010a in FIG. 8). Preferably, the array 2004 of shutters is located on or proximate the plane of the pupil of the eye 210.

It will be appreciated that the numerical aperture of light accepted by the projection optics 1020 is determined by the focal length and diameter of the projection optics. Light emerging from the projection optics 1020 forms a pupil, which may be at the exit aperture of the projection optics 1020 in some embodiments. In addition, the light 2002a, 2002b, 2002c propagating through and exiting the projection optics 1020 continue to propagate in different directions, but also overlap to define a volume 2003. The volume 2003 is an eye-box and may be pyramid shaped in some embodiments. As noted above, the eye-box includes contributions from all of the light emitters 2002 of the micro-display 2000. Preferably, the size (e.g., the lateral dimension) of the projection optics pupil and the size of the eye-box (e.g., the lateral dimension) in which the eye 210 is placed is as large or larger than the size (e.g., the lateral dimension) of the eye 210's pupil when viewing an image from the micro-display 2000. As a result, preferably, the entirety of an image formed on the micro-display 2000 may be viewed by the eye 210. In addition, as noted herein, the array 2004 of shutters is preferably located on or proximate the plane of the pupil of the eye 210, so that the array 2004 of shutters is also within the eye-box volume 2003.

With continued reference to FIG. 9, as noted herein, the micro-display 2000 may comprise an array of light emitters 2002. Examples of light emitters include organic light-emitting diodes (OLEDs) and micro-light-emitting diodes (micro-LEDs). It will be appreciated that OLEDs utilize organic material to emit light and micro-LEDs utilize inorganic material to emit light.

Advantageously, some micro-LEDs provide higher luminance and higher efficiency (in terms of lux/W) than OLEDs. In some embodiments, the micro-displays are preferably micro-LED displays. The micro-LEDs may utilize inorganic materials, e.g., Group III-V materials such as GaAs, GaN, and/or GaIn for light emission. Examples of GaN materials include InGaN, which may be used to form blue or green light emitters in some embodiments. Examples of GaIn materials include AlGaInP, which may be used to form red light emitters in some embodiments. In some embodiments, the light emitters 2002 may emit light of an initial color, which may be converted to other desired colors using phosphor materials or quantum dots. For example, the light emitter 20002 may emit blue light which excites a phosphor material or quantum dot that converts the blue wavelength light to green or red wavelengths.

In some embodiments, the display system 1001 may include an eye tracking device 1022, e.g., a camera, configured to monitor the gaze of the eye. Such monitoring may be used to determine the direction in which the viewer is looking, which may be used to select image content appropriate for that direction. The eye tracking device 1022 may track both eyes of the viewer, or each eye may include its own associated eye tracking device. In some embodiments, vergence of both eyes of the viewer may be tracked and the convergence point of the gaze of the eyes may be determined to determine in what direction and at what distance the eyes are directed.

With continued reference to FIG. 9, the display system 1001 may also include control systems 1024 for determining the timing and the type of image content provided by the display system. In some embodiments, the control system 1024 comprises one or more hardware processors with memory storing programs for controlling the display system 1001. For example, the system 1024 may be configured to control opening of individual shutters of the shutter array 2004, activation of the emitters 2002 of the micro-display 2000, and/or the interpretation and reaction of the display system 1001 to data received from the eye tracking device 1022. Preferably, the system 1024 includes a computation module 1024a configured to receive an input regarding a desired depth plane or wavefront divergence and to calculate the appropriate shutters to open, in order to form parallax views with the proper amount of disparity for the desired depth plane or wavefront divergence. In addition, computation module 1024a may be configured to determine the appropriate actuation of the light emitters 2002 of the micro-display 2000 to form images of the desired parallax views. The system 1024 may also include a synchronization module 1024b that is configured to synchronize the activation of particular shutters of the shutter array 2004 with emission of light by light emitters 2002 of the micro-display 2000 to form images providing the desired parallax views. In addition, the system 1024 may include an eye tracking module 1024c that receives inputs from the eye tracking device 1022. For example, the eye tracking device 1022 may be a camera configured to image the eye 210. Based on images captured by the eye tracking device 1022, the eye tracking module 1024c may be configured to determine the orientation of the pupil and to extrapolate the line of sight of the eye 210. This information may be electronically conveyed to the computation module 1024a. The computation module 1024a may be configured to select image content based upon the line of sight or the gaze of the eye 210 (and preferably also based upon the line of sight or gaze of the other eye of the viewer, e.g., based upon a fixation point of the eyes of the viewer).

Figure 10A:
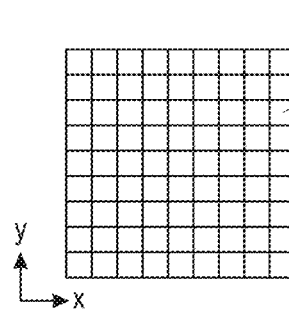
FIGS. 10A-10C illustrate examples of arrays of shutters for providing different parallax views.

With reference now to FIG. 10A, an example of the array 2004 of shutters 2006 is illustrated. The illustrated view is a head-on view, as seen from the direction of light from the micro-display 2000 impinging on the array 2004. As illustrated, the array 2004 may extend in two dimensions and may comprise rows and columns of shutters 2006. Preferably, each of the shutters 2006 may be individually activated, or opened. The location of an opened shutter 2006 may correspond to the desired location of an intra-pupil image. For example, the shutter array 2004 shown in FIG. 9 may have an opened shutter 2006a that corresponds to the location of the light beam 1010a shown in FIG. 8.

Figure 10B:
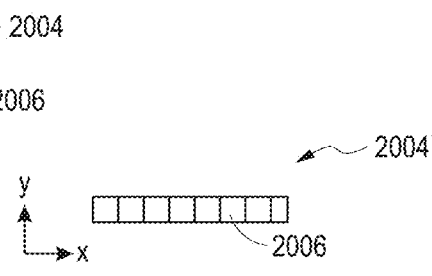
Figure 10C:
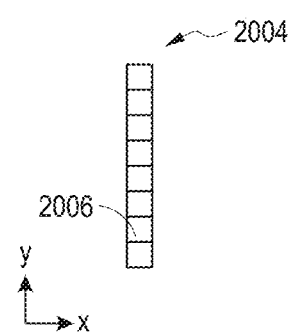

It will be appreciated that the array 2004 may have other overall configurations. For example, for horizontal parallax-only driven accommodation, the array 2004 may be a horizontal line of shutters 2006, as shown in FIG. 10A. In some other embodiments, for vertical parallax-only driven accommodation, the array 2004 may be a vertical line of shutters 2006, as shown in FIG. 10B.

While shown as a grid of squares, the shutters 2006 may be arrayed in any configuration which provides parallax disparity when opening different ones of the shutters 2006. For example, the shutter 2006 may be arranged in a hexagonal grid. In addition, the shutters 2006 may have shapes other than squares. For example, the shutters 2006 may have a hexagonal shape, a circular shape, a triangular-shape, etc. In some embodiments, multiple shutters may be opened, which may allow the sizes and/or shapes of the opening to be selected as desired.

It will be appreciated that the shutters discussed herein are structures that may be independently made transmissive to light. Consequently, an opened shutter is one which has been controlled to be transmissive to light and a closed shutter is one which has been controlled to block light or to be opaque. In some embodiments, the shutters may be physical structures which move between first and second positions to transmit or block light, respectively, by moving out of or into the path of light. In some other embodiments, the shutters may include chemical species which reversibly change states, or orientations, to change the light transmission properties of the shutters. Examples of structures suitable for use as shutters include pixels forming transmissive pixelated liquid crystal displays, mems-based micro-mechanical structures (which may, e.g., move vertically and/or horizontally into and out of the path of light), or other array-segmented structures capable of high switching rates between at least two states. Additional examples of shutters include ferro-electric shutters. Preferably, the shutters are able to change states (switch between transmissive (open) and non-transmissive (closed) states) at a rate greater than the frame update rate of the micro-display 2000 by a factor determined by the number of shutter-aperture sub-pupils (or intra-pupil images) desired for the display system. For example, if the micro-display 2000 is producing images at 120 Hz, and 3 sub-pupils are desired, the shutters 2006 of the shutter array 2004 are preferably capable of a switching rate of at least 3 times the micro-display frame rate, or 3×120 Hz (e.g., 360 Hz or higher).

Preferably, the projection system 1003 (FIG. 9) produces a relatively long depth of field, which may be controlled by limiting the aperture in the system. Without being limited by theory and, as discussed herein, the projection systems may be configured to provide images to the eye with an effective pupil diameter sufficiently small to force the human visual system to operate in "open-loop" mode, as the eye is unable to accommodate to such images individually. Multiple intra-pupil images, however, are believed to provide sufficient information to the eye to elicit a desired accommodative response. As discussed herein, the wavefronts of the light forming the intra-pupil images, in the aggregate, provide a wavefront approximation to which the eye accommodates. In some embodiments, the projection system 1003 may be configured to provide images with an effective pupil diameter of about 0.5 mm or less (e.g., 0.2-0.5 mm), which is believed to be sufficiently small to force the human visual system to operate in "open-loop" mode. Consequently, in some embodiments, the shutters 2006, when opened, provide an opening having a width of 0.5 mm or less (e.g., 0.2-0.5 mm).

With reference again to FIG. 9, it will be appreciated that the illustrated opened shutter 2006₁ is opened at a first time ($t=t_1$) to provide an initial intra-pupil image, showing a first parallax view. Subsequently, at a later time ($t=t_2$) another shutter may be opened to provide a second intra-pupil image, showing a second parallax view.

Figure 11:
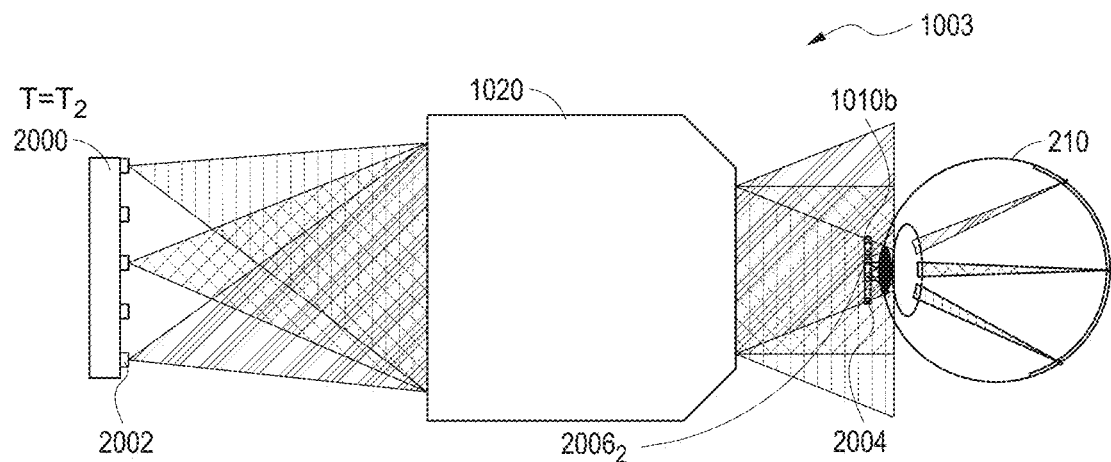
FIG. 11 illustrates an example of the projection system of FIG. 9 providing a different parallactically-disparate intra-pupil image at a different time than that shown in FIG. 9.

With reference now to FIG. 11, an example is illustrated of the projection system of FIG. 9 providing a different parallactically-disparate intra-pupil image at the later time (e.g., at time $t=t_2$). As illustrated, shutter 2006₂ is opened, to provide a beam of light 1010b into the eye 210. The light beam 1010b may form the intra-pupil image shown in the right side of FIG. 8. It will be appreciated that additional shutters may be opened at other times to provide other intra-pupil images, with a set of intra-pupil images for approximating a wavefront curvature preferably being provided to the eye within a flicker fusion threshold.

With reference again to FIG. 9, as noted herein, the flicker fusion threshold of the human visual system places a time constraint on the number of images that may be injected into the eye 210 while still being perceived as being injected simultaneously. For example, the processing bandwidth of the control system 1024 and the ability to switch light-emitting regions of the light source 1026 and light modulators of the micro-display 2000 may limit the number of images that may be injected into the eye 210 within the duration allowed by the flicker fusion threshold. Given this finite number of images, the control system 1024 may be configured to make choices regarding the images that are displayed. For example, within the flicker fusion threshold, the display system may be required to inject a set of parallactically-disparate intra-pupil images into the eye, and in turn each parallax view may require images of various component colors in order to form a full color image. In some embodiments, the formation of full color images using component color images is bifurcated from the elucidation of a desired accommodation response. For example, without being limited by theory, it may be possible to elicit the desired accommodation response with a single color of light. In such a case, the parallactically-disparate intra-pupil images used to elicit the accommodation response would only be in the single color. As a result, it would not be necessary to form parallactically-disparate intra-pupil images using other colors of light, thereby freeing up time within the flicker fusion threshold for other types of images to be displayed. For example, to better approximate the wavefront, a larger set of parallactically-disparate intra-pupil images may be generated.

In some other embodiments, the control system 1024 may be configured to devote less time within the flicker fusion threshold for displaying images of colors of light for which the human visual system is less sensitive. For example, the human visual system is less sensitive to blue light then green light. As a result, the display system may be configured to generate a higher number of images formed with green light than images formed with blue light.

It will be appreciated that the light emitters of the micro-display 2000 may emit light with a large angular emission profile (e.g., a Lambertian angular emission profile). Undesirably, such an angular emission profile may "waste" light, since only a small portion of the emitted light may ultimately propagate through the projection optics 1020 and reach the eyes of the viewer.

Figure 12:
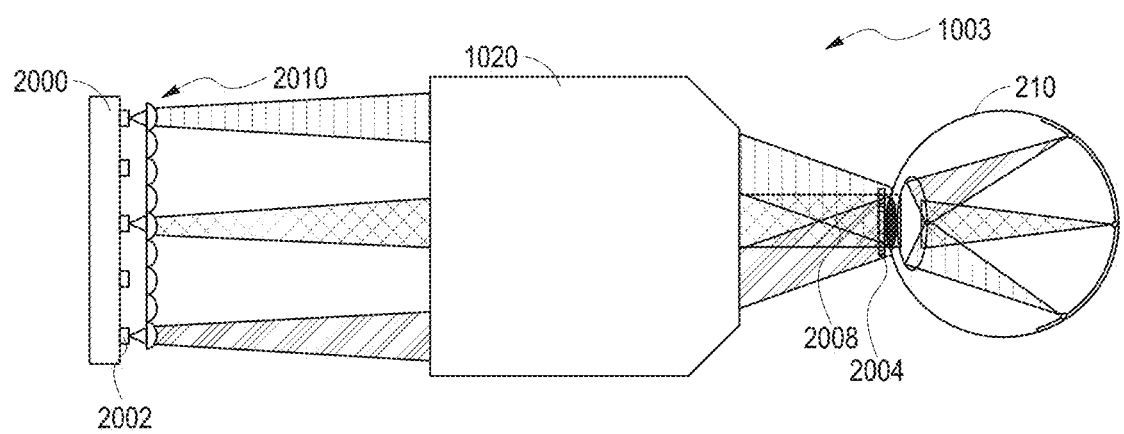
FIG. 12 illustrates an example of the projection systems of FIGS. 9 and 11 with an array of light collimators between an emissive micro-display and projection optics.

With reference now to FIG. 12, in some embodiments, light collimators may be utilized to narrow the angular emission profile of light emitted by the light emitters. FIG. 12 illustrates an example of the projection systems of FIGS. 9 and 11 with an array of light collimators 2010 between emissive micro-display 2000 and projection optics 1020. The array of light collimators 2010 is disposed forward of the light emitters 2002. In some embodiments, each light emitter 2002 has a dedicated light collimator 2010; each light emitter 2002 is matched 1-to-1 with an associated light collimator 2010 (one light collimator 2010 per light emitter 2002). The light collimator may be configured to take light from an associated light emitter 2002 and image that light at optical infinity (or some other not infinite plane, in some other embodiments).

The light collimator 2010 may be configured to narrow the angular emission profile of incident light; for example, as illustrated, each light collimator 2010 receives light from an associated light emitter 2002 with a relatively wide initial angular emission profile and outputs that light with a narrower angular emission profile than the wide initial angular emission profile of the light emitter 2002. In some embodiments, the rays of light exiting a light collimator 2010 are more parallel than the rays of light received by the light collimator 2010, before being transmitted through and exiting the collimator 2010. Advantageously, the light collimators 2010 may increase the efficiency of the utilization of light to form images by allowing more of that light to be directed into the eye of the viewer than if the collimators 2010 are not present.

Preferably, the light collimators 2010 are positioned in tight proximity to the light emitters 2002 to capture a large proportion of the light outputted by the light emitters 2002. In some embodiments, there may be a gap between the light collimators 2010 and the light emitters 2002. In some other embodiments, the light collimator 2010 may be in contact with the light emitters 2002. Preferably, the entirety or majority of a cone of light from a light emitter 2002 is incident on a single associated light collimator 2010. Thus, in some embodiments, each light emitter 2002 is smaller (occupies a smaller area) than the light receiving face of an associated light collimator 2010. In some embodiments, each light emitter 2002 has a smaller width than the spacing between neighboring light emitters 2002.

The light collimators 2010 may take various forms. For example, in some embodiments, the light collimators 2010 may be micro-lenses or lenslets, including spherical or lenticular lenslets. As discussed herein, each micro-lens preferably has a width greater than the width of an associated light emitter 2002. The micro-lenses may be formed of curved transparent material, such as glass or polymers, including photoresist and resins such as epoxy. In some embodiments, light collimators 2010 may be nano-lenses, e.g., diffractive optical gratings. In some embodiments, light collimators 2010 may be metasurfaces and/or liquid crystal gratings. In some embodiments, light collimators 2010 may take the form of reflective wells.

Figure 13:
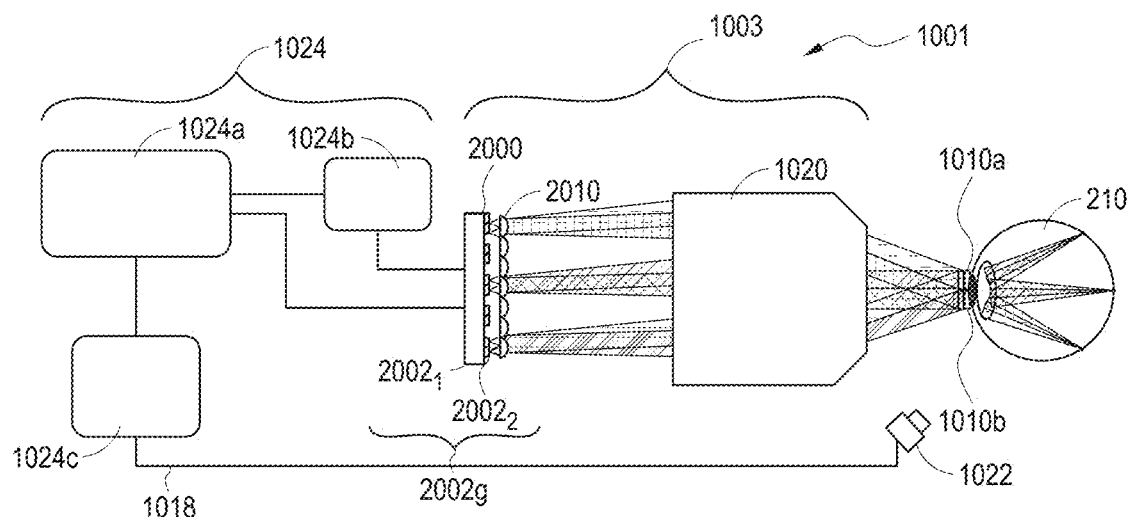
FIG. 13 illustrates another example of a display system comprising a projection system for forming the divergent wavefront approximation of FIGS. 7B and 8.

With reference now to FIG. 13, another example of a projection system 1003 for forming the divergent wavefront approximation of FIGS. 7B and 8 is illustrated. In some embodiments, the projection system 1003 may comprise the micro-display 2000 and an array of light collimators 2010 disposed between the micro-display 2000 and the projection optics 1020. The projection system is part of the display system 1001, having the control system 1024 for controlling the projection system 1003 and the eye tracking device 1022, as discussed above regarding FIG. 9.

With continued reference to FIG. 13, the micro-display 2000 may comprise a plurality of light emitters 2002. The light emitters 2002 may be arranged in groups comprising two or more light emitters per group. Each group of light emitters 2002 includes an associated light collimator 2010. As illustrated, each group $2002g$ of light collimators may include two light emitters $2002_1$, $2002_2$, and the associated light collimator $2010_1$ is configured to capture light from both light emitters. Preferably, the associated light collimator $2010_1$ has a width that extends across both light emitters $2002_1$, $2002_2$, so that the associated light collimator $2010_1$ encompasses an area greater than the area of both the light emitters $2002_1$, $2002_2$. In some embodiments, the light collimators 2010 are spaced from the light emitters $2002_1$, $2002_2$. In some other embodiments, the light collimators 2010 may contact the light emitters $2002_1$, $2002_2$. For example, the light collimators 2002 may be lenslets, and the light emitters $2002_1$, $2002_2$ may be disposed within the associated lenslet $2010_1$.

It will be appreciated that the location of a light emitter relative to an associated light collimator may influence the direction of light propagating out of the light collimator. The light emitters $2002_1$, $2002_2$ interface differently (e.g., are located at different locations) with the associated light collimator $2010_1$, which causes the light collimator $2010_1$ to direct light from each of the light emitters $2002_1$, $2002_2$ along different paths to the projections optics 1020 and then to the eye 210. Preferably, the locations of the light emitters $2002_1$, $2002_2$ and the physical parameters (e.g., the size and shape) of the associated light collimator $2010_1$ are configured to provide different light paths corresponding to different intra-pupil images. While two light emitters $2002_1$, $2002_2$ are provided for clarity of illustration, it will be appreciated that each group of light emitters associated with a light collimator may have more than two light emitters. For example, each of the groups 2002g may have three or more light emitters, four or more light emitters, etc. Larger numbers of spatially distinct light emitters facilitate larger numbers of potential levels of parallax disparity.

In some embodiments, the image light from a light emitter of each group of light emitters may be directed by the associated light collimators 2010 and the projection optics 1020 to form a first intra-pupil image as the beam of light 1010a, and the image light from another light emitter of each group of light emitters may be directed by the associated light collimators 2010 and the projection optics 1020 to form a second intra-pupil image as the beam of light 1010b. As discussed herein, the light beams 1010a, 1010b preferably have a sufficiently small diameter that the eye is unable to accommodate to the individual images formed by each beam of light. In some embodiments, the diameter of each beam of light 1010a, 1010b, at the pupil of the eye 210, is about 0.5 mm or less (e.g., 0.2-0.5 mm).

With continued reference to FIG. 13, the projection system 1003, including the groups 2002g of light emitters $2002_1$, $2002_2$ may form different intra-pupil images using spatial multiplexing. For such spatial multiplexing, light emitters at different locations may be used to form different intra-pupil images; that is, different light emitters of each group of light emitters may provide image information for different intra-pupil images. The light from corresponding light emitters of each group of light emitters is directed by optical structures (e.g., the light collimator of the array 2010 of light collimators and the projection optics 1020) to form one of the light beams 1010a, 1010b for forming a corresponding intra-pupil image. Advantageously, the intra-pupil images may be provided to the eye simultaneously, obviating the need to rapidly sequentially provided images under the flicker fusion threshold. This may relax requirements for the frame rate of the micro-display 2000 and the supporting control system 1024.

Figure 14:
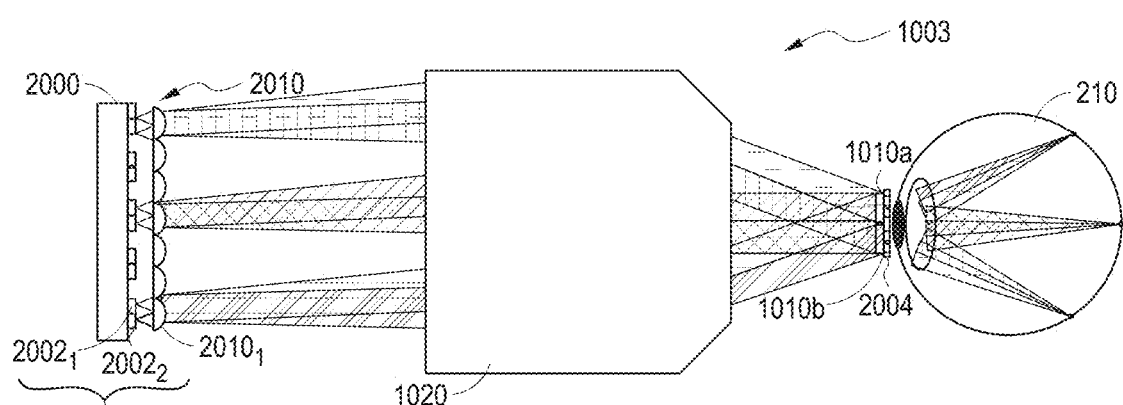
FIG. 14 illustrates an example of a projection system having an array of light collimators and an array of shutters for forming different parallactically-disparate intra-pupil images.

With reference now to FIG. 14, it will be appreciated that the projection system 1003 of FIG. 13 may include both light collimators with associated groups of light emitters, and also an array 2004 of shutters, to provide a combination of spatial and temporal multiplexing. The array 2004 of shutters may further refine the locations and/or sizes of beams of light entering the eye and forming intra-pupil images. For example, the beams of light outputted by the array 2010 of light collimators may be larger than desired for forming intra-pupil images (e.g., larger than that desired for open loop operation of the eye, including larger than 0.5 mm in diameter). The shutters of the shutter array 2004 may be utilized to limit the size of the light beam that ultimately enters the eye 210. In addition, each beam of light provided by the light collimators of the collimator array 2010 may impinge on multiple shutters. As a result, the shutters may provide additional levels of parallax disparity for each incident beam of light, which may facilitate the presentation of virtual content on a larger number of depth planes than would be provided by only the beams of light outputted by the light collimator array 2010.

In some embodiments, the display system may temporally multiplex in one dimension (e.g., along the x-axis) and spatially multiplex in another dimension (e.g., along an orthogonal dimension, such as the y-axis). For example, the light collimators may be lenticular lenslets, rather than spherical lenslets, and may be configured to provide different beams of light from spatially distinct light emitters to different locations along a first axis, which is orthogonal to a second axis which may be the elongate axis of the lenticular lenslet. An array of shutters may be utilized to form subpupils at different points and different times along that second axis. For example, localization of a subpupil along the first axis may be achieved by spatial multiplexing, by activating different light emitters of each group of light emitters associated with a lenticular lenslet (which is elongated along the second axis), while the localization of the subpupil along the second axis may be provided by temporal-multiplexing, by opening shutters on the second axis at desired times (e.g., times overlapping the activation of the corresponding light emitters used for spatial multiplexing).

Figure 15:
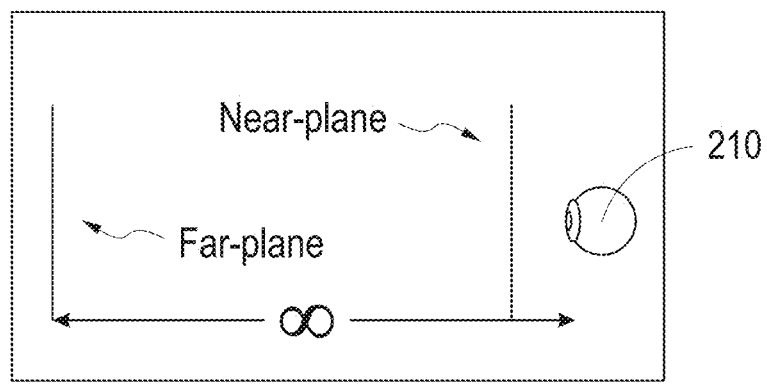
FIG. 15 illustrates an example of a range of depth planes provided by projection systems according to various embodiments.

With reference now to FIG. 15, an example is illustrated of a range of depth planes provided by the projection systems disclosed herein. The range spans from a far plane at optical infinity to a near plane closer to the eye 210. The far plane at optical infinity may be provided by intra-pupil images formed by light beams (e.g., light beams 1010a and 1010b) that are substantially collimated or parallel relative to one another. For such a far plane, the light beams may be understood to have no or low parallax disparity.

With continued reference to FIG. 15, closer depth planes may be provided using higher levels of parallax disparity. In some embodiments, the perceived nearness of the near plane to the eye 210 may be determined by the maximum parallax disparity between the light beams forming intra-pupil images. For example, the maximum parallax disparity between the light beams 1010a and 1010b may be determined by the maximum distance between shutters of the array 2004 of shutters (FIGS. 9-12 and 14) and/or the maximum difference in direction provided by each light collimator 1010a for light from light emitters 2002 of its associated group of light emitters (FIGS. 13 and 14).

Figure 16A:
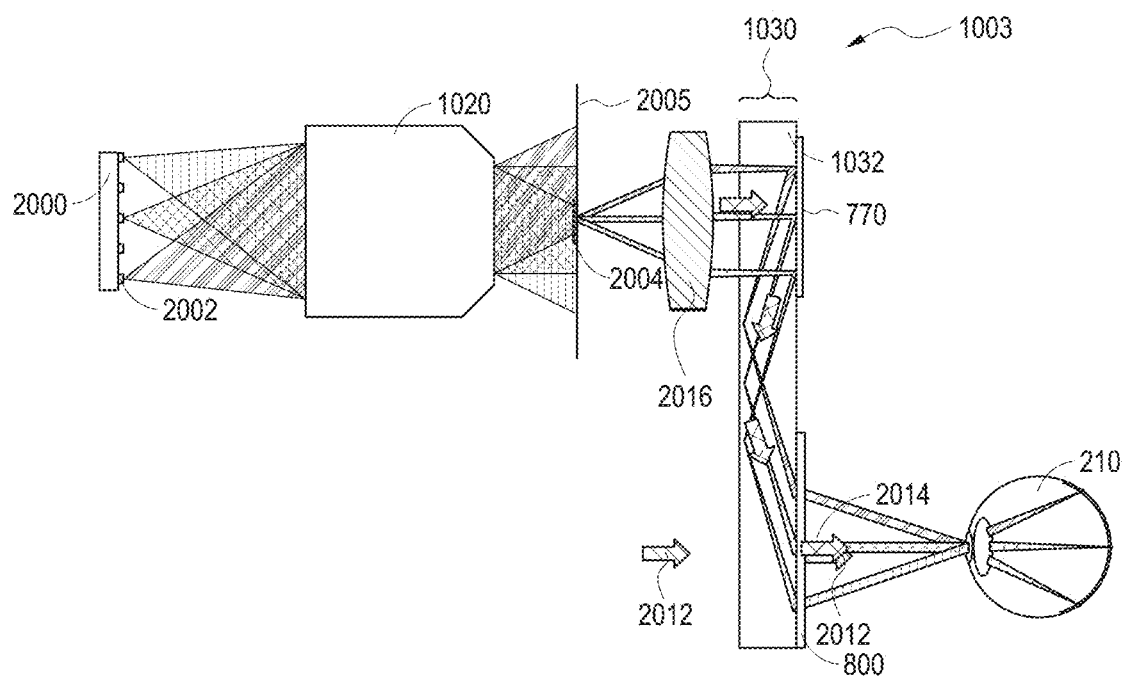
FIG. 16A illustrates an example of a display system comprising a projection system, comprising an array of shutters, and a pupil relay combiner eyepiece for superimposing image content on a user's view of the world.

With reference now to FIG. 16A, an example is illustrated of a display system comprising a projection system, comprising an array of shutters, and a pupil relay combiner eyepiece for superimposing image content on a user's view of the world. Preferably, the eyepiece 1030 is optically transmissive, allowing light 2012 from the world to propagate through the eyepiece into the eye 210 of the viewer, so that the viewer can see the world. In some embodiments, the eyepiece 1030 comprises one or more waveguides 1032 having in-coupling optical elements and out-coupling optical elements, such as in-coupling 770 and out-coupling optical elements 800. The in-coupling optical element 770 receives image light 2014 from the projection system 1003 and redirects that image light such that it propagates through the eyepiece 1030 by total internal reflection to the out-coupling optical element 800. The out-coupling optical element 800 outputs the image light 2014 to the viewer's eye 210. Advantageously, eyepiece 1030 preserves all of the image attributes of provided by the projection system 1003, and thus rapidly switching parallax views are accurately portrayed through the eyepiece 1030. It will be appreciated that the image light 2014 is the light emitted by the micro-display 2000 and may correspond to, e.g., the light 200*a*, 2002*b*, 2002*c* (FIG. 9) or the light provided through the array 2010 of light collimators (FIGS. 13 and 14).

As illustrated, the projection system 1003 may comprise the array 2004 of shutters on the pupil plane 2005, through which light exits the projection system 1003 towards the in-coupling optical element 770. A lens structure 2016 may be provided between the shutter array 2004 and in-coupling optical element 770 to relay the image light 2014. In some embodiments, the lens structure 2016 may also collimate the image light 2014 for propagation within a waveguide 1032 forming the eyepiece 1030.

The in-coupling optical element 770 and the out-coupling optical element 800 may be refractive or reflective structures. Preferably, the in-coupling optical element 770 and the out-coupling optical element 800 are diffractive optical elements. Examples of diffractive optical elements include surface relief features, volume-phase features, meta-materials, or liquid-crystal polarization gratings. While illustrated being disposed on the same side of the waveguide 1032, it will be appreciated that the in-coupling optical element 770 and the out-coupling optical element 800 may be disposed on different sides of the waveguide 1032. Also, while shown on the side of the waveguide 1032 opposite the projection optics 1020, one or both of the in-coupling optical element 770 and the out-coupling optical element 800 may be deposed on the same side of the waveguide 1032 as the projection optics 1020.

Figure 16B:
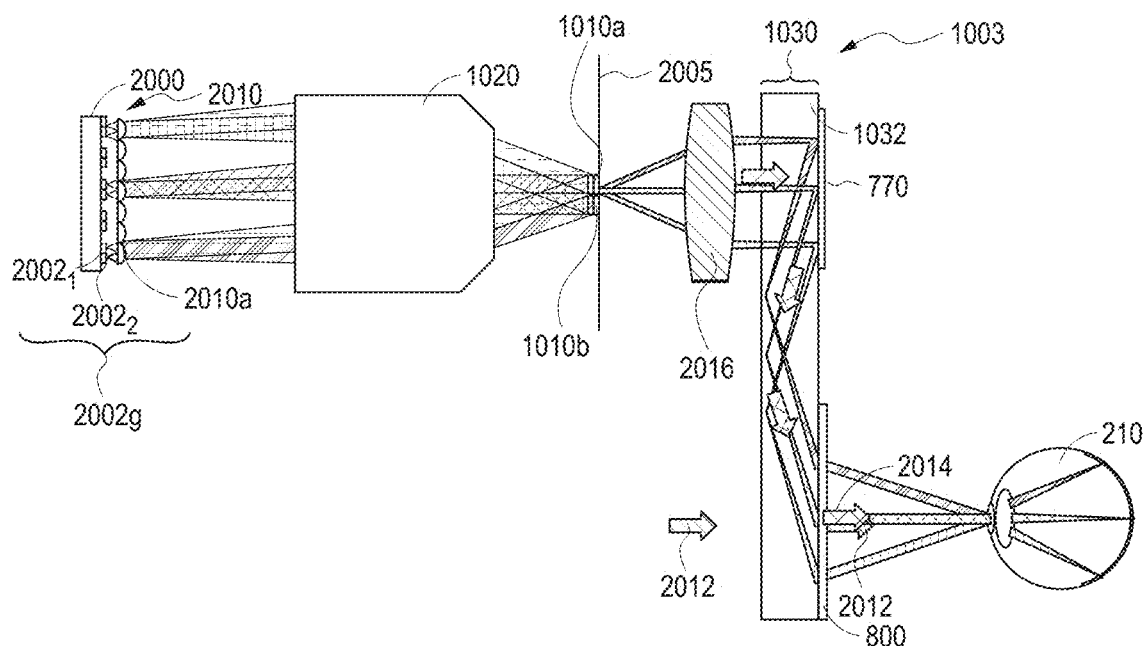
FIG. 16B illustrates an example of a display system comprising a projection system, comprising an array of light collimators for providing different intra-pupil images, and a pupil relay combiner eyepiece for superimposing image content on a user's view of the world.

FIG. 16B illustrates an example of a display system comprising a projection system, comprising an array of light collimators for providing different intra-pupil images, and a pupil relay combiner eyepiece for superimposing image content on a user's view of the world. The display system of FIG. 16B is similar to that of FIG. 16A, except that the projection system 1003 is similar to that of FIG. 13, rather than the projection system of FIG. 9. As illustrated, the projection system 1003 may comprise the micro-display 2000 and an array of light collimators 2010 between the micro-display 2000 and the projection optics 1020. The micro-display 2000 may comprise a plurality of light emitters, formed in groups 2002*g*, with one group per light collimator 2010. The location of a light emitter relative to the associated light collimator determines the direction of light propagating out of the light collimator and, thus, the parallax disparity between images formed using different light emitters $2002_1$, $2002_2$ of a group 2002*g* of light emitters. As a result, as noted herein, activation of different light emitters within a group of light emitters sets the parallax disparity between intra-pupil images formed using different light emitters. In some embodiments, light from a first light emitter $2002_1$ of each group 2002*g* of light emitters is directed by the associated light collimators 2010 and the projection optics 1020 to form a first intra-pupil image with the beam of light 1010*a*, and light from a second light emitter $2002_2$ of each group 2002*g* of light emitters may be directed by the associated light collimators 2010 and the projection optics 1020 to form a second intra-pupil image with the beam of light 1010*b*.

It will be appreciated that any of the embodiments of projection systems disclosed herein may be utilized in the display systems of FIGS. 16A and 16B, e.g., as the projection system 1003 of these figures. For example, the projection system 1003 may utilize both light collimators and an array of shutters as shown in, e.g., FIGS. 12 and 14.

Figure 17A:
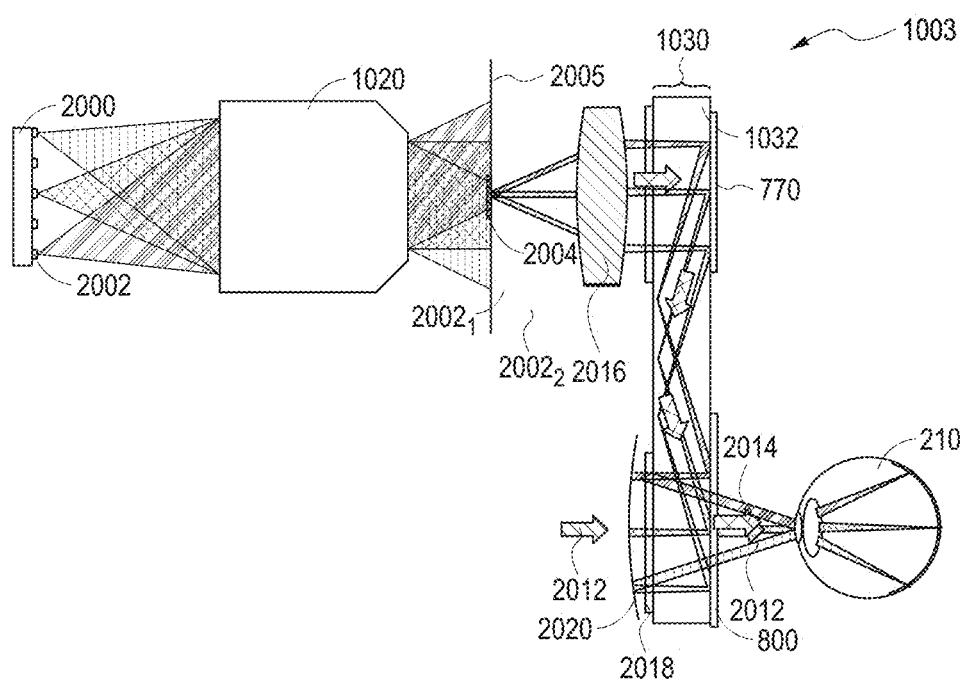
FIG. 17A illustrates another example of a display system comprising a projection system, comprising an array of shutters, and a pupil relay combiner eyepiece for superimposing image content on a user's view of the world.

FIG. 17A illustrates another example of a projection system, comprising an array of shutters, and a pupil relay combiner eyepiece for superimposing image content on a user's view of the world. The illustrated display system is similar to that of FIG. 16A, except for the optical structures associated with the eyepiece 1030. The eyepiece 1030 may comprise a partially transparent relay mirror 2020 for reflecting image light 2014 into the eye 210. As illustrated, the image light 2014 is in-coupled by the in-coupling optical element 770, which redirects the light 2014 such that it propagates through the waveguide 1032. The eyepiece 1030 includes an outcoupling optical element 800 which directs the image light 2014 forward, through a quarter waveplate 2018 on the forward face of the waveguide 1032. As illustrated, the partially transparent relay mirror 2020 may be forward of and spaced apart from the quarter wave plate 2018 and waveguide 1032.

Figure 17B:
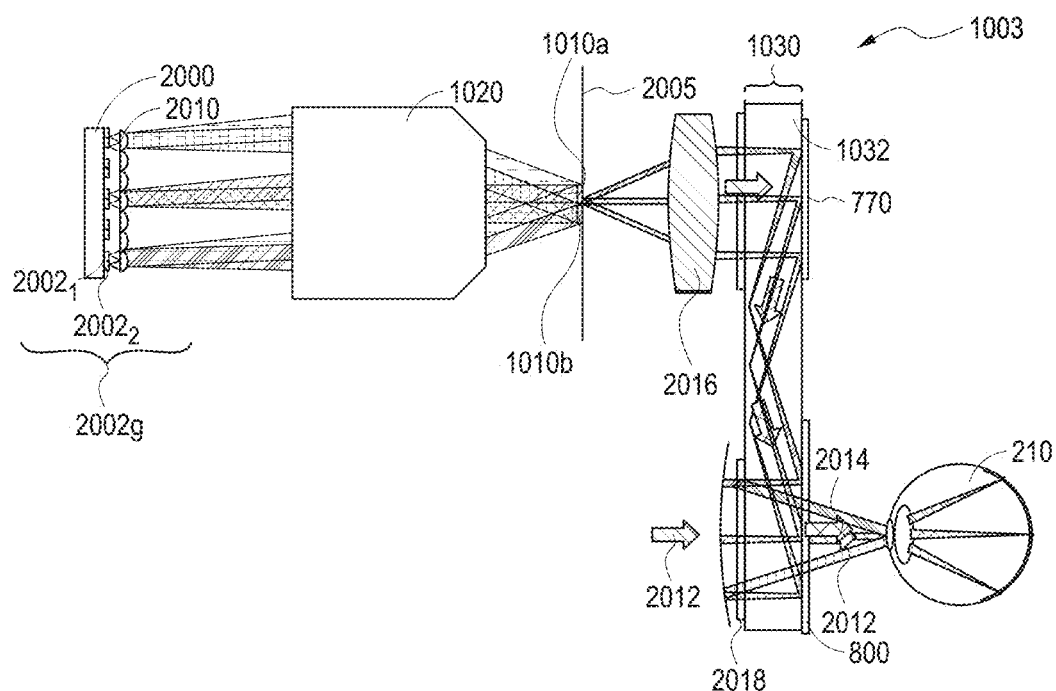
FIG. 17B illustrates another example of a display system comprising a projection system, comprising an array of light collimators for providing different intra-pupil images, and a pupil relay combiner eyepiece for superimposing image content on a user's view of the world.

FIG. 17B illustrates another example of a display system comprising a projection system, comprising an array of light collimators for providing different intra-pupil images, and a pupil relay combiner eyepiece for superimposing image content on a user's view of the world. The illustrated display system is similar to that of FIG. 16B, except for the optical structures associated with the eyepiece 1030. The eyepiece 1030 and associated structures are similar to that illustrated in FIG. 17A. As noted above, image light 2014 is in-coupled by the in-coupling optical element 770 and propagates through the waveguide 1032 by total internal reflection. The outcoupling optical element 800 that outputs the image light 2014 forward away from the eye 210 through a quarter waveplate 2018 to the partially transparent relay mirror 2020. As illustrated, the partially transparent relay mirror 2020 may be forward of and spaced apart from the quarter wave plate 2018 and waveguide 1032 and reflects the image light 2014 into the eye 210. In some embodiments, the partially transparent relay mirror 2020 may be configured to selectively reflect light of the polarization transmitted through the quarter wave plate 2018.

Figure 18:
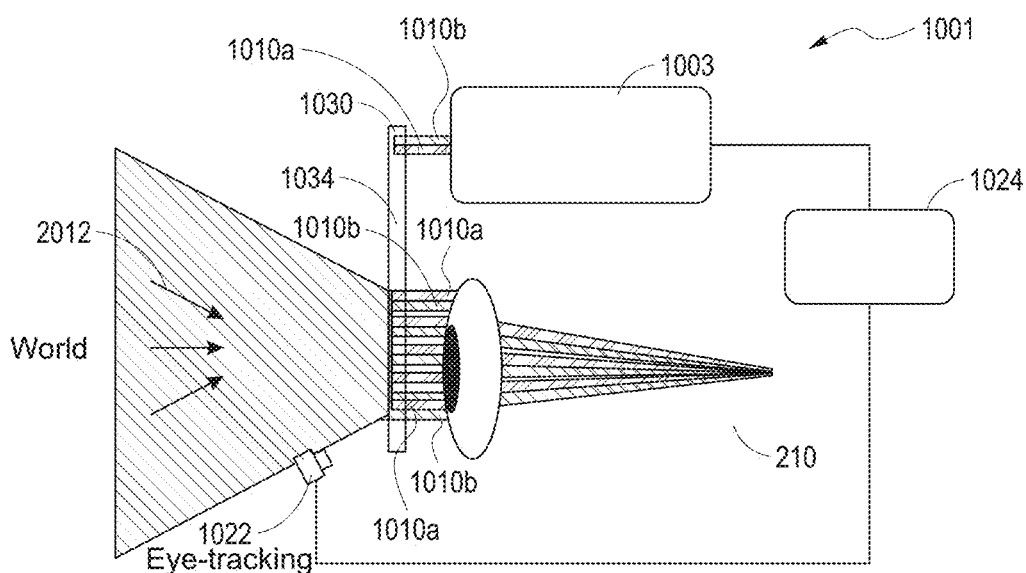
FIG. 18 illustrates an example of a display system comprising an eye tracking system and a combiner eyepiece with a pupil expander.

With reference now to FIG. 18, an example is illustrated of a display system 1001 having a projection system 1003 comprising the eye tracking system 1022 and a combiner eyepiece 1030 with a pupil expander 1034. The pupil expander 1034 may comprise, e.g., diffractive optical elements configured to replicate the projection system pupil across the eyepiece 1030. Since the pupil expander 1034 replicates the projection system pupil across a large area that may be traversed by the viewer's pupil through eye motion, the images formed by the micro-display 2000 and locations of the light-emitting regions of the light source 1026 can be updated based on input from the eye tracking system 1022 in real time. Advantageously, this configuration enables a larger eye-box for more comfortable viewing, relaxing restrictions on eye-to-combiner relative positioning and variations in inter-pupillary distance.

Figure 19:
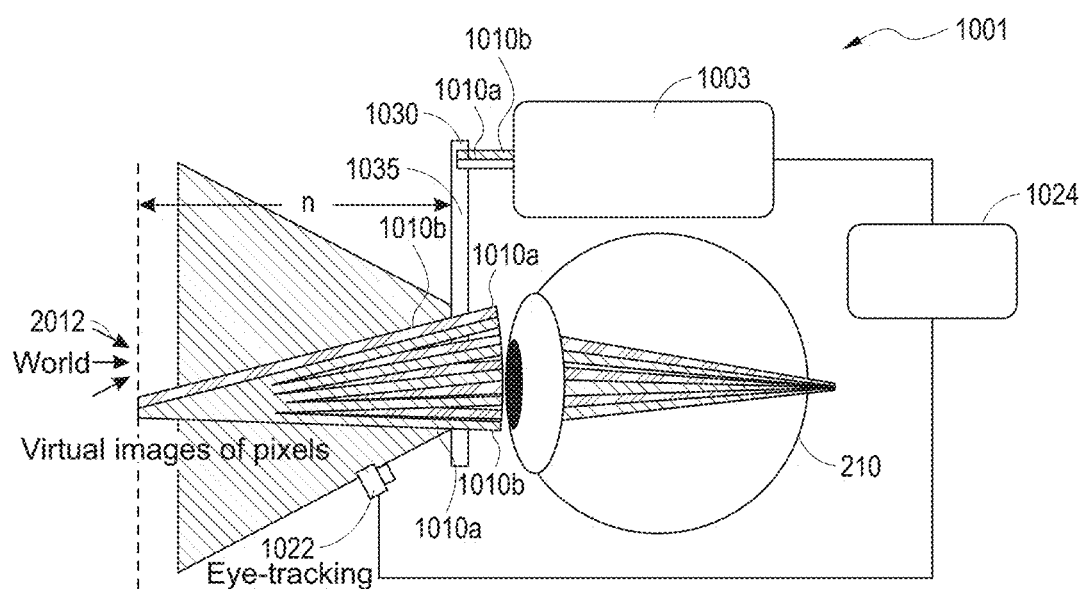
FIG. 19 illustrates an example of a display system comprising an eye tracking system and a pupil rely combiner eyepiece with a pupil expander configured to produce a non-infinity depth plane.

With reference now to FIG. 19, an example is illustrated of a display system 1001 having a projection system 1003 comprising eye tracking system 1022 and a combiner eyepiece 1030 with a pupil expander 1035 configured to produce a non-infinity depth plane. In some embodiments, the non-infinity depth plane may be at 3 meters, which offers an in-budget accommodation of ~2.5 meters to infinity. For example, given the tolerance of the human visual system for accommodation-vergence mismatches, virtual content at distances of ~2.5 meters to infinity from the viewer may be placed on the 3 meter depth plane with little discomfort. In such a system, the parallactically-disparate intra-pupil images may be used to drive accommodation for a narrower range of depth planes, possibly all closer to the viewer than the fixed "default" focal plane. In some embodiments, this system may also incorporate the eye tracking system 1022 to determine the distance of the viewer's fixation based, e.g., on vergence angles of both eyes of the viewer.

It will be appreciated that the micro-display 2000 may be a monochrome display, and the display system 1001 may be configured to provide monochrome images to the eye 210. More preferably, the display system 1001 is configured to provide full color images to the eye 210. In such embodiments, the micro-display 2000 may be a full color micro-display. For example, the full color images may be formed by providing different images formed by different component colors (e.g., three or more component colors, such as red, green, and blue), which in combination are perceived to be full color images by the viewer. Micro-display 2000 may be configured to emit light of all component colors. For example, different colors may be emitted by different light emitters.

In some other embodiments, full color images may be formed using component color images provided by a plurality of micro-displays, at least some of which are monochrome micro-displays. For example, different monochrome micro-displays may be configured to provide different component-color images. The component color images may be provided simultaneously to the eye 210, or may be temporally multiplexed (e.g., all of the different component color images for forming a single full color image may be provided to the eye 210 within a flicker fusion threshold).

Figure 20A:
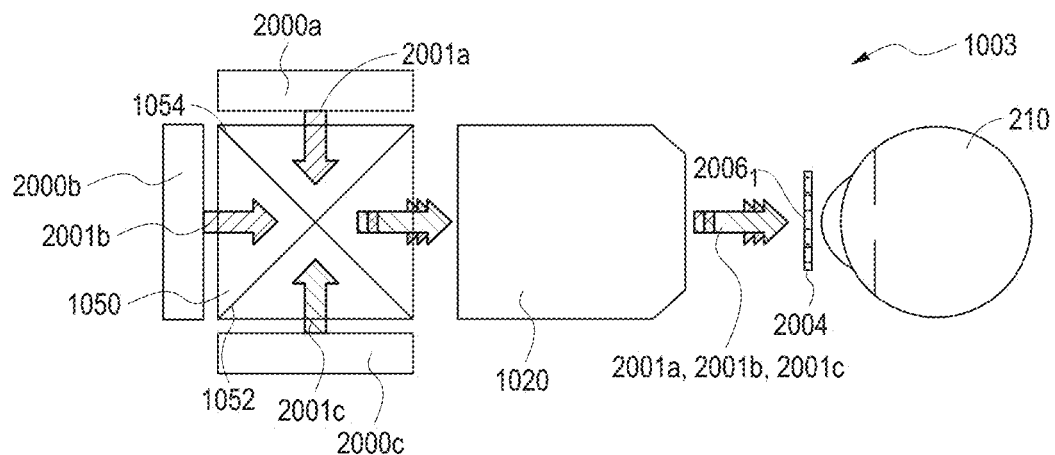
FIGS. 20A-20B illustrate examples of projection systems having multiple micro-displays.
Figure 20B:
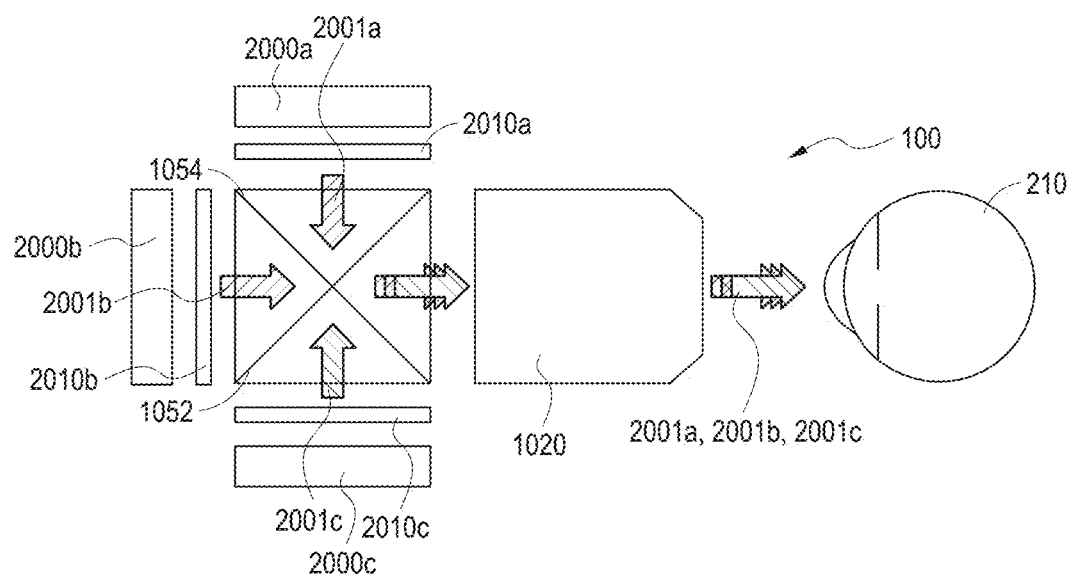

FIGS. 20A-20B illustrate examples of projection systems having multiple emissive micro-displays 2000*a*, 2000*b*, 2000*c*. The micro-displays 2000*a*, 2000*b*, 2000*c* may each be similar to the micro-display 2000 disclosed herein (see, e.g., FIGS. 9, 11-14, and 16A-17B). Light from the micro-displays 2000*a*, 2000*b*, 2000*c* are combined by an optical combiner 1050 and directed towards projection optics 1020, and ultimately to the eye 210 of a viewer. As discussed herein, in some embodiments, the light from the projection optics 1020 may be directed to the eyepiece 1030, which may be a waveguide assembly comprising one or more waveguides.

In some embodiments, the micro-displays 2000*a*, 2000*b*, 2000*c* may be monochrome micro-displays. Each monochrome micro-display may output light of a different component color to provide different monochrome images, which may be combined by the viewer to form a full-color image.

With continued reference to FIG. 20A, the optical combiner 1050 receives image light 2001*a*, 2001*b*, 2001*c*, respectively, from each of the micro-displays 2000*a*, 2000*b*, 2000*c* and combines this light such that the light propagates generally in the same direction, e.g., toward the projection optics 1020. In some embodiments, the optical combiner 1050 may be a dichroic X-cube prism having reflective internal surfaces 1052, 1054 that redirect the image light 2001*c*, 2001*a*, respectively, to the projection optics 1020. The projection optics 1020 converges or focuses image light, which impinges on the array 2004 of shutters. The image light 2001*a*, 2001*b*, 2001*c* then propagates through an open shutter (e.g., shutter 2006*i*) and into the eye 210.

With reference now to FIG. 20B, an example of a light projection system 1010 with multiple emissive micro-displays 2000*a*, 2000*b*, 2000*c*, and associated arrays 2010*a*, 2010*b*, 2010*c* of light collimators, respectively, is illustrated. The arrays 2010*a*, 2010*b*, 2010*c* may each be similar to the array 2010 disclosed herein (see, e.g., FIGS. 12-14, 16B, and 17B).

In some embodiments, the arrays 2010*a*, 2010*b*, 2010*c* may each comprise light collimators configured to narrow the angular emission profiles of image light 2001*a*, 2001*b*, 2001*c* emitted by the micro-displays 1030*a*, 1030*b*, 1030*c*. The image light 2001*a*, 2001*b*, 2001*c* subsequently propagates through the optical combiner 1050 to the projection optics 1020, and then into the eye 210. In addition, each light collimator may have an associated group of light emitters (e.g., as illustrated in FIGS. 13, 14, 16B, and 17B) and may direct light from different light emitters of each group of emitters along different paths, corresponding to different amount of parallax disparity, for forming different intra-pupil images, as discussed herein.

With reference to FIGS. 20A and 20B, in some other embodiments, the micro-displays 2000*a*, 2000*b*, 2000*c* may each be full-color displays configured to output light of all component colors. For example, the micro-displays 2000*a*, 2000*b*, 2000*c* may each include light emitters configured to emit red, green, and blue light. The micro-displays 2000*a*, 2000*b*, 2000*c* may be identical and may display the same image. However, utilizing multiple micro-displays may provide advantages for increasing the brightness and brightness dynamic range of the brightness of the image, by combining the light from the multiple micro-displays to form a single image. In some embodiments, two or more (e.g., three) micro-displays may be utilized, with the optical combiner 1050 is configured to combine light from all of these micro-displays.

With continued reference to FIGS. 20A and 20B, in some embodiments, the monochrome micro-display 2000*b* directly opposite the output face 1051 may advantageously output green light. It will be appreciated that the reflective surfaces 1052, 1054 may have optical losses when reflecting light from the micro-displays 2000*c*, 2000*a*, respectively. In addition, of the component colors red, green and blue, the human eye is most sensitive to the color green. Consequently, the monochrome micro-display 2000*b* opposite the output face of the optical combiner 1050 preferably outputs green light, so that the green light may proceed directly through the optical combiner 1050 without needing to be reflected to be outputted from the optical combiner 1050. It will be appreciated, however, that the green monochrome micro-display may face other surfaces of the optical combiner 1050 in some other embodiments.

In some embodiments, as discussed herein, the display system may comprise an eyepiece (e.g., eyepiece 1030, FIGS. 16A-19) to relay light outputted by the projection optics 1020 to the eye 210. In some embodiments, the eyepiece may comprise a single waveguide configured to in-couple and out-couple light of all component colors.

In some other embodiments, the eyepiece 1030 may comprise a plurality of waveguides that form a stack of waveguides. Each waveguide has a respective in-coupling optical element for in-coupling image light. For example, each waveguide may have an associated in-coupling optical element configure to in-couple light of a different component color or a different range of wavelengths. In some embodiments, the number of waveguides is proportional to the number of component colors provided by the micro-displays 2000*a*, 2000*b*, 2000*c*. For example, where there are three component colors, the number of waveguides in the eyepiece 1030 may include a set of three waveguides or multiple sets of three waveguides. Examples of arrangements of waveguides and associated structures are discussed in U.S. Prov. Application No. 62/800,363, filed Feb. 1, 2019, the entire disclosure of which is incorporated by reference herein.

Figure 21:
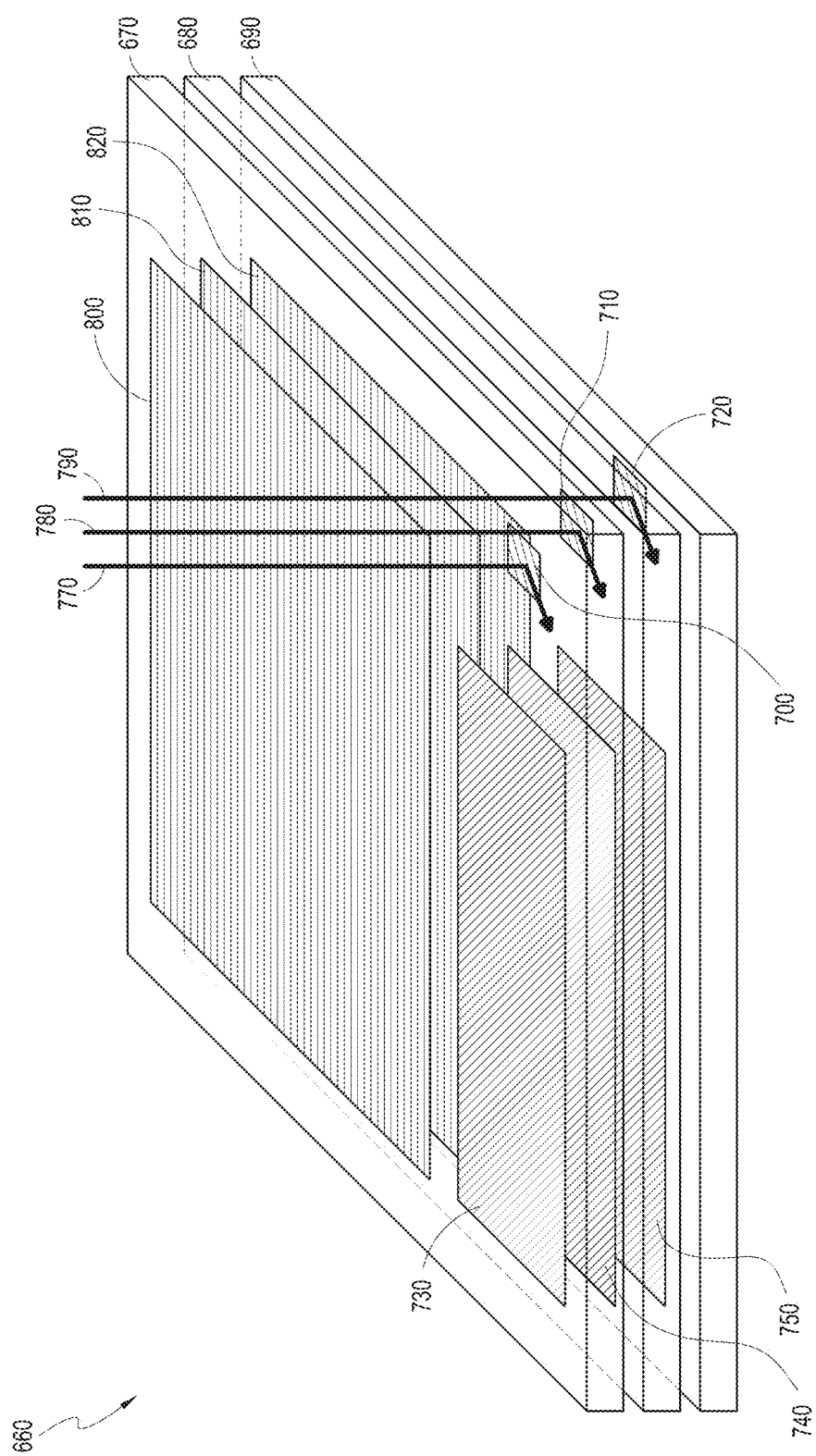
FIG. 21 illustrates an example of an eyepiece comprising a stacked waveguide assembly for outputting light of different wavelengths corresponding to different component colors.

With reference now to FIG. 21, an example is illustrated of an eyepiece 660 (which may correspond to the eyepiece 1030, FIGS. 16A-19) comprising a stacked waveguide assembly for outputting light of different wavelengths corresponding to different component colors. In some embodiments, the waveguide assembly includes waveguides 670, 680, and 690, which individually may correspond to the waveguide 1032 (FIGS. 16A-17B). Each waveguide includes an associated in-coupling optical element, with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720. In some embodiments, the in-coupling optical elements 700, 710, 720 are vertically aligned and are not laterally offset.

Each waveguide may also include associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

With continued reference to FIG. 21, light rays 770, 780, 790 are incident on and injected into the waveguides 670, 680, 690 by projection system 1003 (FIGS. 9, 11-14, and 16A-17B).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 21, the in-coupled light rays 770, 780, 790 are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's both deflect or distribute light to the out-coupling optical elements 800, 810, 820 and also increase the beam or spot size of this light as it propagates to the out-coupling optical elements. In some embodiments, e.g., where the beam size is already of a desired size, the light distributing elements 730, 740, 750 may be omitted and the in-coupling optical elements 700, 710, 720 may be configured to deflect light directly to the out-coupling optical elements 800, 810, 820. In some embodiments, the out-coupling optical elements 800, 810, 820 are exit pupils (EP's) or exit pupil expanders (EPE's) that direct light in a viewer's eye 210 (see, e.g., FIG. 18). It will be appreciated that the OPE's may be configured to increase the dimensions of the eye-box in at least one axis and the EPE's may be to increase the eye-box in an axis crossing, e.g., orthogonal to, the axis of the OPEs.

Accordingly, in some embodiments, the eyepiece 660 includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then ultimately out-couples the light ray 790 to the viewer, who also receives the out-coupled light from the other waveguides 670, 680.

As noted above, the in-coupling optical elements 700, 710, 720 may be laterally offset from one another. In such embodiments, image light 2001*a*, 2001*b*, 2001*c* from different ones of the micro-displays 2000*a*, 2000*b*, 2000*c* may take different paths to the eyepiece 1030, such that they impinge on different ones of the in-coupling optical element 700, 710, 720. Where the image light 2001*a*, 2001*b*, 2001*c* includes light of different component colors, the associated in-coupling optical element 700, 710, 720, respectively, may be configured to selectively in-couple light of different wavelengths, as discussed herein.

The different light paths for the image light 2001*a*, 2001*b*, 2001*c* may be provided by the combiner 1050 (FIGS. 20A-20B); by one or more of the arrays 2010*a*, 2010*b*, 2010*c*; and/or by angling one or more of the micro-displays 2000*a*, 2000*b*, 2000*c* at appropriate angles relative to the reflective surfaces 1052, 1054 of the optical combiner 1050. For example, with reference to FIGS. 20A-20B, the optical combiner 1050 may be configured to redirect the image light 2001*a*, 2001*b*, 2001*c* emitted by the micro-displays 2000*a*, 2000*b*, 2000*c* such that the image light propagates along different optical paths, in order to impinge on the associated one of the in-coupling optical elements 700, 710, 720. Thus, the optical combiner 1050 combines the image light 2001*a*, 2001*b*, 2001*c* in the sense that the image light is outputted from a common face of the optical combiner 1050, although light may exit the optical combiner in slightly different directions. For example, the reflective internal surfaces 1052, 1054 of the X-cube prism may each be angled to direct the image light 2001*a*, 2001*b*, 2001*c* along different paths to the eyepiece 1030. As a result, the image light 2001*a*, 2001*b*, 2001*c* may be incident on different associated ones of in-coupling optical elements 700, 710, 720. In some embodiments, the micro-displays 2000*a*, 2000*b*, 2000*c* may be appropriately angled relative to the reflective internal surfaces 1052, 1054 of the X-cube prism to provide the desired light paths to the in-coupling optical elements 700, 710, 720. For example, faces of one or more of the micro-displays 2000*a*, 2000*b*, 2000*c* may be angled to matching faces of the optical combiner 1050, such that image light emitted by the micro-displays is incident on the reflective internal surfaces 1052, 1054 at an appropriate angle to propagate towards the associated in-coupling optical element 700, 710, 720. It will be appreciated that, in addition to a cube, the optical combiner 1050 may take the form of various other polyhedra. For example, the optical combiner 1050 may be in the shape of a rectangular prism having at least two faces that are not squares.

As discussed herein, the perception of a full color image by a user may be achieved with time division multiplexing in some embodiments. For example, different ones of the micro-LED arrays 2000*a*, 2000*b*, 2000*c* may be activated at different times to generate different component color images. In such embodiments, the different component color images that form a single full color image may be sequentially displayed sufficiently quickly that the human visual system does not perceive the component color images as being displayed at different times; that is, the different component color images that form a single full color image may all be displayed within a duration that is sufficiently short that the user perceives the component color images as being simultaneously presented, rather than being temporally separated. For example, the component color images may be sequentially displayed at a frame rate higher than the flicker fusion threshold of the human visual system. As an example, the flicker fusion threshold may be 60 Hz, which is considered to be sufficiently fast that most users do not perceive the component color images as being displayed at different times. In some embodiments, the different component color images are sequentially displayed at a rate higher than 60 Hz. It will be appreciated that time division multiplexing may advantageously reduce the computational load on processors (e.g., graphics processors) utilized to form displayed images. In some other embodiments, such as where sufficient computational resources are available, all component color images that form a full color image may be displayed simultaneously by the micro-displays 2000*a*, 2000*b*, 2000*c*.

Figure 22:
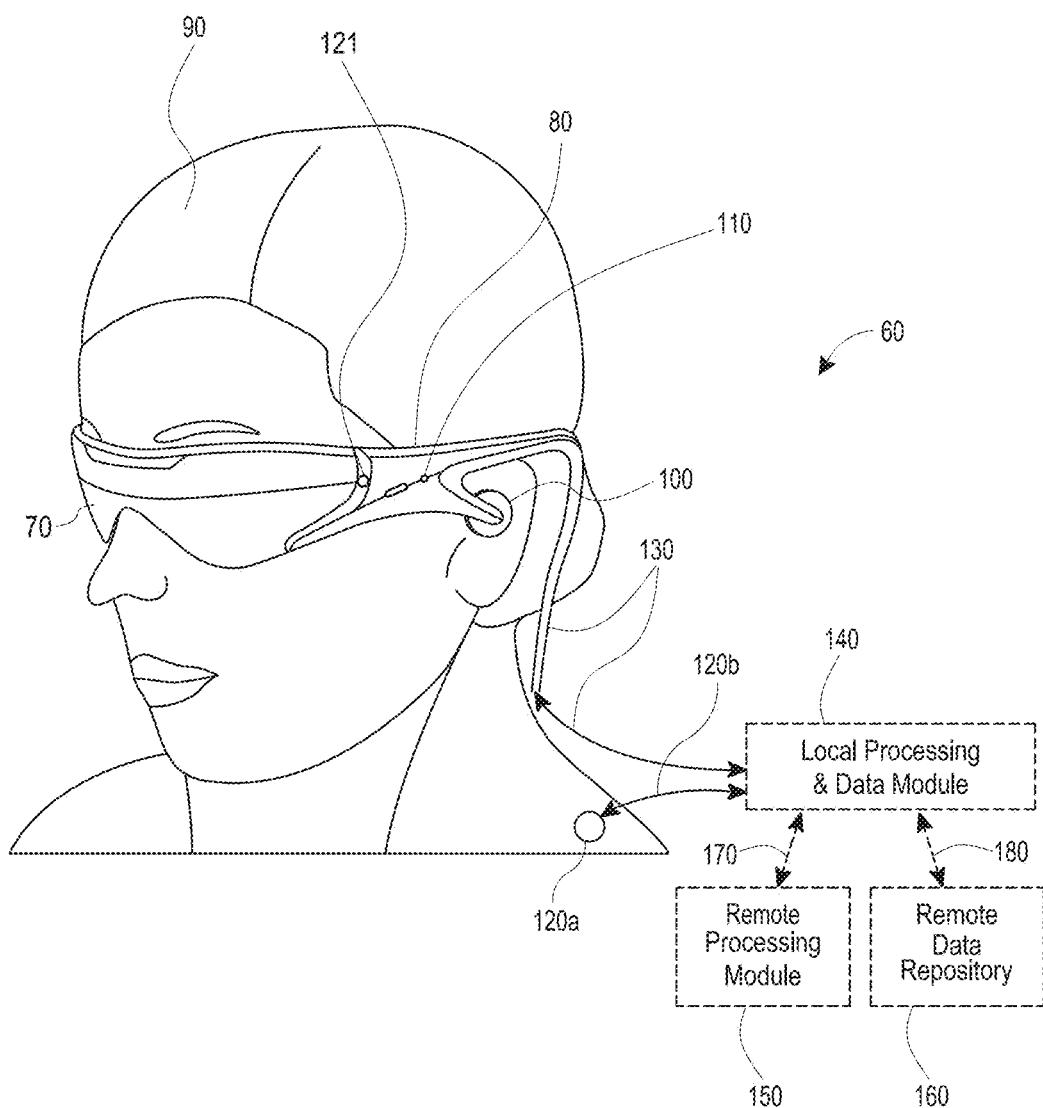
FIG. 22 illustrates an example of a wearable display system.

With reference now to FIG. 22, an example is illustrated of a wearable display system 60. The display system 60 may correspond to the display system 1001 of FIGS. 9 and 13, with a projection system 1003 for each eye of the viewer or user 90.

The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 121 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 22, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways. In some embodiments, the local processing and data module 140 may include one or more graphics processors, and may correspond to the control system 1024 (FIGS. 9 and 13).

With continued reference to FIG. 22, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method for displaying image content, the method comprising:
    injecting, from a head-mounted display system, a set of parallactically-disparate intra-pupil images into an eye of a viewer,
    wherein injecting the set of parallactically-disparate intra-pupil images comprises:
        providing an array of groups of light emitters;
        providing an array of light collimators overlying the light emitters, wherein each light collimator is associated with a group of the light emitters;
        providing projection optics, wherein the array of light collimators is between the array of groups of light emitters and the projection optics,
        providing an array of selectively-activated shutters for selectively transmitting image light to the eye from different locations, wherein the array of selectively-activated shutters is disposed within an eye-box volume of the projection optics, wherein the light collimators are lenticular lenslets configured to provide different beams of light, from light emitters of an associated group of light emitters, to different locations along a first axis, wherein the array of shutters are arranged to form subpupils along a second axis orthogonal to the first axis,
        injecting a first parallactically-disparate intra-pupil image into the eye by emitting light from a first light emitter of the groups of light emitters;
        injecting a second parallactically-disparate intra-pupil image into the eye by emitting light from a second light emitter of the groups of light emitters; and spatially-multiplexing multiple images formed by different light emitters of the groups of light emitters to localize a display subpupil along the first axis, and temporally-multiplexing multiple images by synchronizing opening of the shutters with activation of corresponding light emitters.

2. The method of claim 1, wherein each of the images of the set of parallactically-disparate intra-pupil images are injected into the eye at different angles and all images of the set of parallactically-disparate intra-pupil images are injected into the eye within a flicker fusion threshold.

3. The method of claim 2, wherein the flicker fusion threshold is $1/60$ of a second.

4. The method of claim 1, wherein the different images provide different views of the virtual object.

5. The method of claim 1, wherein injecting the first parallactically-disparate intra-pupil image and injecting the second parallactically-disparate intra-pupil image are performed simultaneously.

6. The method of claim 1, wherein the array of shutters comprises selectively-movable physical structures.

7. The method of claim 1, wherein the array of shutters comprises chemical species having reversibly changeable states, the states providing different amounts of light transmission.

8. The method of claim 1, wherein injecting the first parallactically-disparate intra-pupil image and injecting the second parallactically-disparate intra-pupil image comprise routing light from the light emitters to the eye through a pupil relay combiner eyepiece.

9. The method of claim 8, wherein the pupil relay combiner eyepiece comprises a waveguide comprising:
    in-coupling optical elements for in-coupling the image light into the waveguide; and
    out-coupling optical elements for out-coupling in-coupled image light out of the waveguide.

10. The method of claim 1, further comprising injecting, from the head-mounted display system, a second set of parallactically-disparate intra-pupil images into a second eye of a viewer.

* * * * *